(12) United States Patent
Nassim

(10) Patent No.: US 9,705,297 B1
(45) Date of Patent: Jul. 11, 2017

(54) DEVICES, SYSTEMS, AND METHODS FOR MOUNTING ELECTRICAL DEVICES FOR BUILDING WALL CONSTRUCTIONS

(71) Applicant: Elias Nassim, Elmsford, NY (US)

(72) Inventor: Elias Nassim, Elmsford, NY (US)

(73) Assignee: Elias Nassim, Elmsford, NY (US)

( * ) Notice: Subject to any disclaimer, the term of this patent is extended or adjusted under 35 U.S.C. 154(b) by 0 days.

(21) Appl. No.: 15/331,420

(22) Filed: Oct. 21, 2016

Related U.S. Application Data

(60) Provisional application No. 62/346,891, filed on Jun. 7, 2016.

(51) Int. Cl.
*H02G 3/12* (2006.01)
*H02G 3/08* (2006.01)
*H01H 23/04* (2006.01)

(52) U.S. Cl.
CPC ............ *H02G 3/121* (2013.01); *H01H 23/04* (2013.01); *H02G 3/081* (2013.01)

(58) Field of Classification Search
CPC .......... H02G 3/08; H02G 3/081; H02G 3/121; H02G 3/123; H02G 3/125; H01H 23/04; H01H 9/02; H01H 9/0207; H01H 9/04; H01H 23/06
USPC .. 174/480, 481, 50, 53, 57, 58, 63, 61, 502; 220/3.2–3.8, 4.02; 248/906
See application file for complete search history.

(56) References Cited

U.S. PATENT DOCUMENTS

| | | | | |
|---|---|---|---|---|
| 2,316,389 | A * | 4/1943 | Atkinson | H02G 3/126 174/63 |
| 5,386,959 | A * | 2/1995 | Laughlin | H02B 1/015 248/906 |
| 5,677,512 | A * | 10/1997 | Reiker | H02G 3/081 174/58 |
| 6,484,980 | B2 * | 11/2002 | Medlin, Sr. | H02G 3/125 248/906 |
| 7,435,902 | B2 * | 10/2008 | Thornton | H02B 1/03 248/906 |
| 7,572,977 | B2 * | 8/2009 | Gorman | H02G 3/125 174/480 |
| 7,705,239 | B2 * | 4/2010 | Gates | H01R 13/508 174/481 |
| 8,785,774 | B1 * | 7/2014 | Gretz | H02G 3/125 174/50 |
| 9,010,696 | B2 * | 4/2015 | Siddiqui | H02G 3/32 174/481 |

* cited by examiner

*Primary Examiner* — Angel R Estrada
(74) *Attorney, Agent, or Firm* — Leason Ellis LLP

(57) ABSTRACT

A system and method for mounting an electrical device to a wall structure that includes studs and wall board attached to the studs, wherein an electrical device assembly is mounted so that the outer most component of the electrical device assembly is substantially flush with a front surface of the wall board. Brackets extend between adjacent studs. An electrical box is connected to the brackets, a base plate is connected to the electrical box, and an electrical box is connected to the base plate. A cover is supported by the base plate and at least partially covers the electrical device being mounted to the wall structure. In an assembled condition, the outer most portions of the electrical device assembly are substantially flush with the wall board.

19 Claims, 22 Drawing Sheets

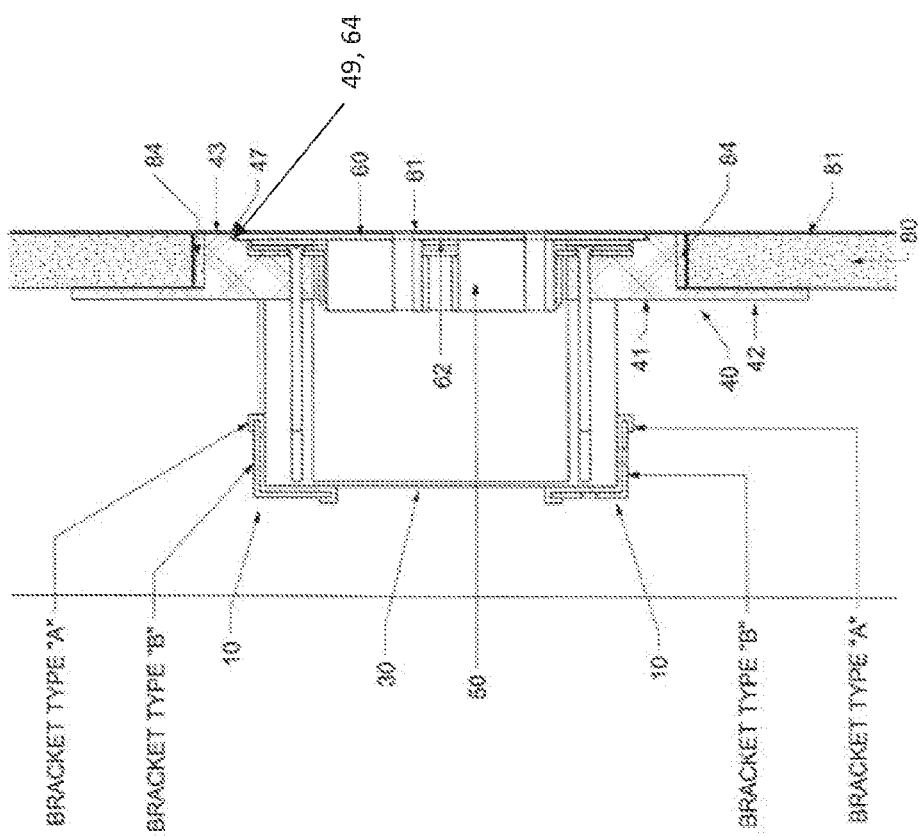

DEVICES, SYSTEMS, AND METHODS FOR MOUNTING ELECTRICAL DEVICES FOR BUILDING WALL CONSTRUCTIONS

CROSS REFERENCE TO RELATED APPLICATION

This application claims benefit to U.S. Provisional Application No. 62/346,891, filed 7 Jun. 2016, entitled "Brackets and Base Plate for Electrical Outlet that is Flush with a Wall," which is hereby incorporated by reference in its entirety.

TECHNICAL FIELD

A system, method, and device for mounting electrical devices and, in particular, mounting electrical devices flush with a building wall is provided.

BACKGROUND OF THE INVENTION

When building and/or renovating structures such as residential homes, it is desirable to provide aesthetically pleasing walls. Such structures require electrical systems for powering lights and other appliances. Accordingly, switches, receptacles, and other electrical devices are ordinarily provided in the wall. These electrical devices are typically connected to electrical boxes which are mounted to studs behind the walls with the electrical devices extending through the wall to the front surface. Electrical devices installed in this manner typically protrude outward from the front surface of the wall and include covers that further extend outward to cover the opening in the wall in which the devices are mounted. This results in a visible and aesthetically displeasing appearance.

Accordingly, there is a need to provide mounting system in which the visibility of the electrical device assembly relative to the wall surface is reduced. The present invention as described herein provides a solution to this and other problems.

SUMMARY

According to one aspect of the invention, an electrical device system for mounting to a wall structure that includes studs and wall board attached to the studs, wherein an electrical device assembly, to which an electrical component can be attached as a part of the electrical device assembly, is configured to be mountable so that an outer most component of the electrical device assembly is substantially flush with a front surface of the wall board is provided. The system includes at least one bracket disposed between adjacent studs of the wall structure, with an electrical box connected to the at least one bracket. A base plate has a flange defining an adhesive bonding surface and a ring portion defining a recess. The base plate is disposed adjacent to an opening of the electrical box. A cover plate is received in the recess. The brackets, base plate, and cover plate are sized and shaped such that in an assembled condition, in which the wall board is attached to the studs, outer most portions of the base plate and cover plate, respectively, are substantially flush with the front surface of the wall board and the cover plate covers at least a portion of the electrical component.

According to a further aspect, a backer plate is received within the recess and disposed between the cover plate and the base plate. The cover plate includes at least one magnet supported by the cover plate, wherein the at least one magnet magnetically couples the cover plate to the backer plate.

According to a yet further aspect, the cover plate includes at least one slot sized and shaped to receive the at least one magnet, the slots being located such that they are not visible from a front surface of the cover plate.

According to a further aspect, adhesive is disposed on a least a portion of the flange, wherein the adhesive bonds the flange to a rear surface of the wall board in the assembled condition.

According to a further aspect, the cover plate defines at least one opening that provides functional access to the electrical device.

According to a further aspect, the electrical device is an electrical receptacle.

According to a further aspect, the electrical device is switch.

According to a further aspect, the electrical device is rocker switch.

According to a further aspect, the electrical device is rocker switch having a dimmer control.

According to a further aspect, the electrical device is contactless switch.

According to another aspect, at least two brackets are provided that are slidably engaged such that the brackets slide with respect to each other to extend between the adjacent studs.

According to a further aspect, the at least one bracket provides a rigid mounting surface.

According to another aspect of the present invention, a method for mounting an electrical device system to a wall structure that includes studs and wall board attached to the studs, wherein an electrical device assembly is mounted so that the outer most component of the electrical device assembly is substantially flush with a front surface of the wall board is provided. The method includes the steps of attaching at least one bracket between adjacent studs of the wall structure and attaching an electrical box to the at least one bracket. A base plate is disposed adjacent the electrical box, the base plate having a flange defining an adhesive bonding surface and a ring portion defining a recess. An electrical device is disposed at least partially in the recess of the base plate. A cover plate is disposed in the recess such that it covers at least a portion of the electrical device. A wall board is attached to the studs, in which the wall board has an opening sized and shaped to receive the ring portion of the base plate, wherein the brackets, base plate, and cover plate are sized and shaped such that when the wall board is attached to the studs, outer most portions of the base plate and cover plate, respectively, are substantially flush with the front surface of the wall board.

According to a further aspect, the method includes the steps of applying adhesive to the flange such that the adhesive bonds the flange to a rear surface of the wall board.

According to a further aspect, the method includes the steps of disposing a masking plate in the recess, prior to disposing the cover plate in the recess and applying wall board compound such that it extends between at least a portion of the wall board and the ring portion of the base plate.

According to a further aspect, the method includes the steps of removing the mask plate after applying the wall board compound and prior to disposing the cover plate within the recess and applying paint such that it extends between at least a portion of the wall board and the cover plate.

These and other aspects, features and advantages will be apparent upon consideration of the following description of certain embodiments of the invention in view of the accompanying drawing figures.

BRIEF DESCRIPTION OF THE DRAWINGS

FIG. 24 is a cross-section view of an electrical assembly thereof attached to a wall board.

DETAILED DESCRIPTION CERTAIN OF EMBODIMENTS OF THE INVENTION

Figure 1:
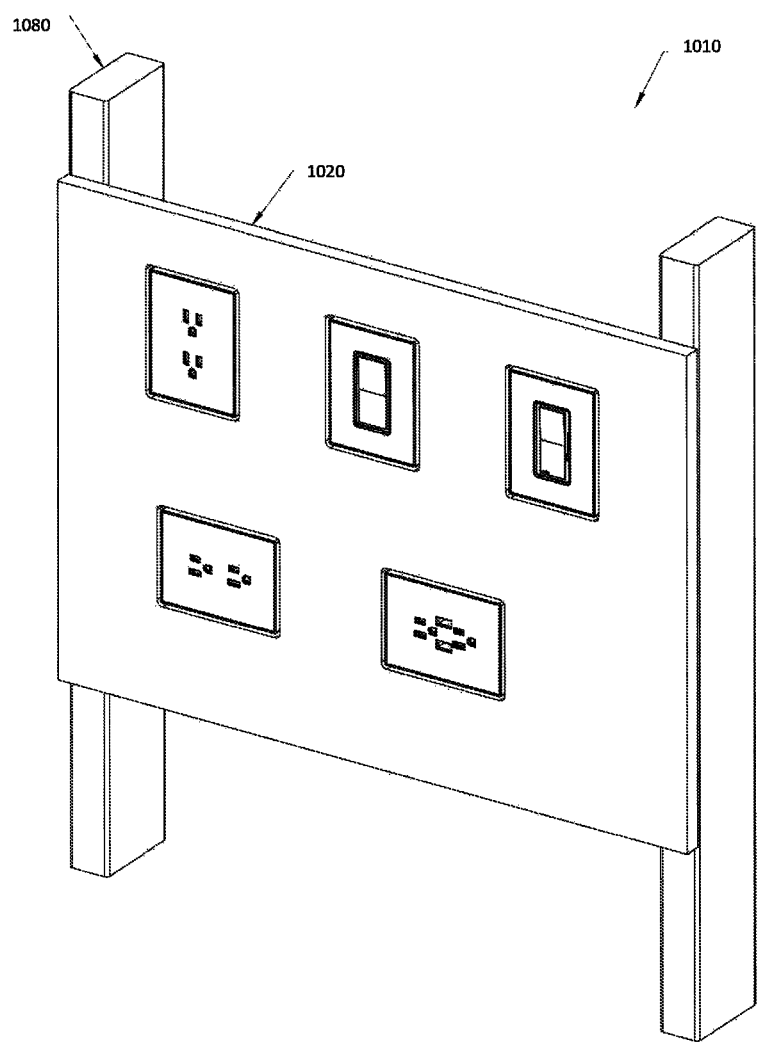
FIG. 1 is a front perspective view of a wall including electrical assemblies according to an embodiment of the present invention.
Figure 2:
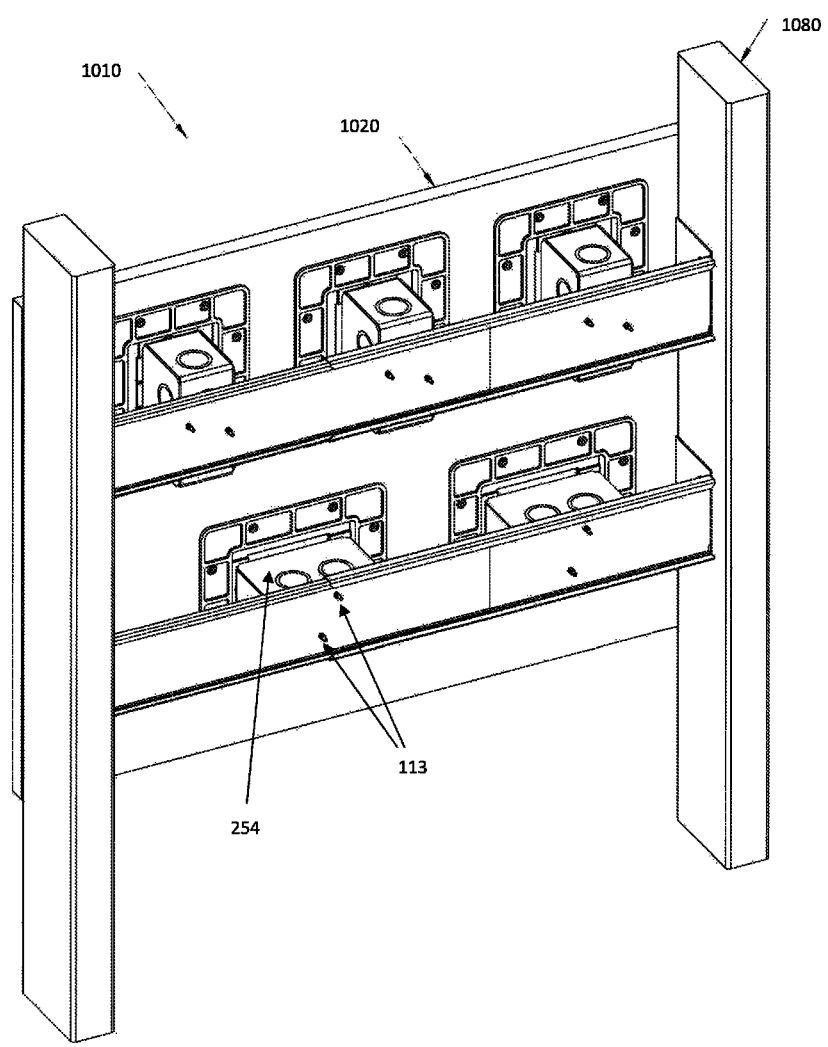
FIG. 2 is a rear perspective view thereof.
Figure 3:
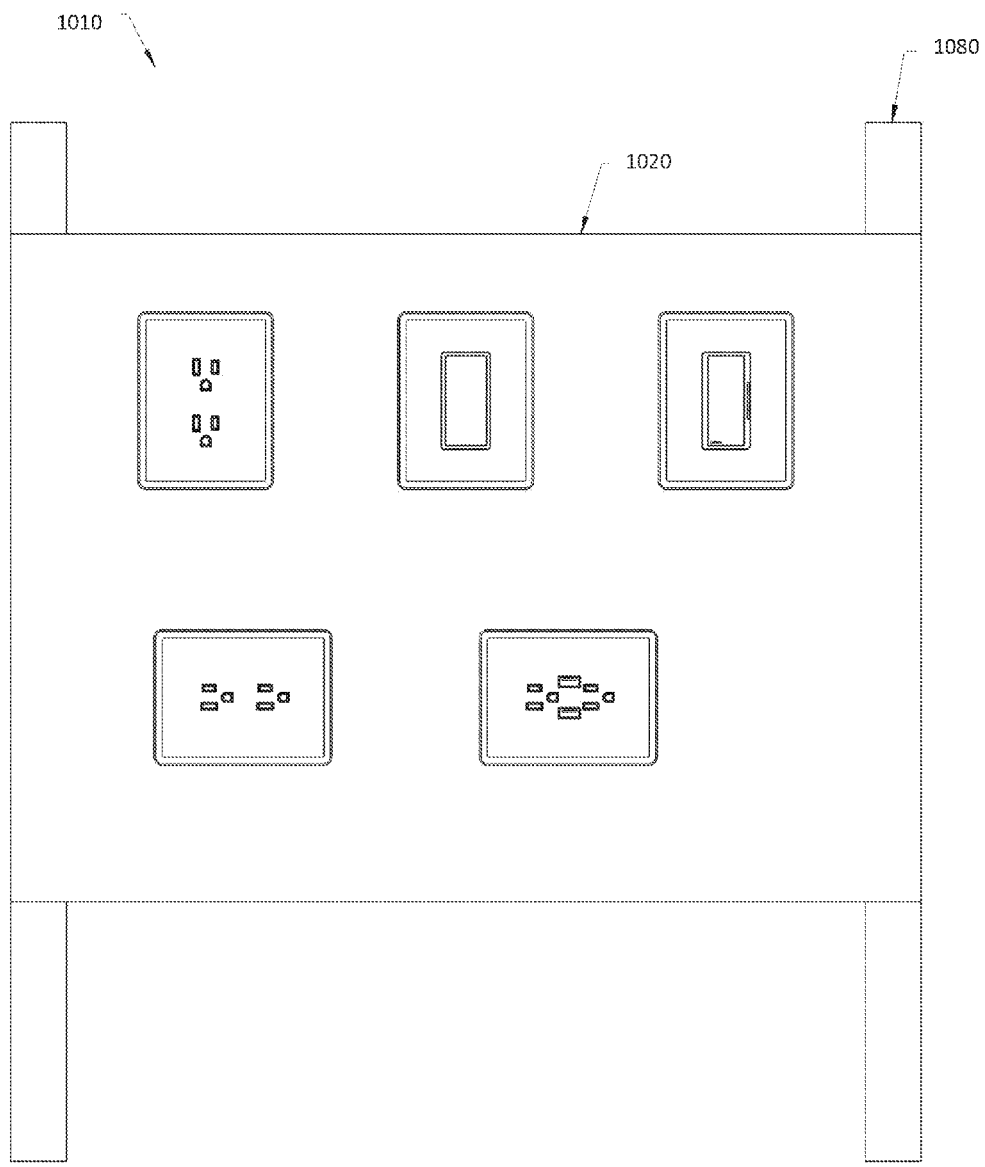
FIG. 3 is a front view thereof.

Referring to FIGS. 1-3 an electrical box mounting device and system 1010 is provided. The system 1010 permits the mounting of electrical boxes and electrical devices in a typical wall construction (e.g., residential home, commercial building, office space, etc.) consisting of wall board 1020 (e.g., drywall board) and spaced apart studs 1080 (e.g., metal, wood, etc.). An advantage of the system 1010 is that electrical device assemblies 1030, 1040, 1050, 1060, and 1070 can be mounted at various locations and various orientations relative to the wall construction. Various electrical devices, such as switches, dimmer switches, plugs, plugs with accessories, etc. can be mounted using the system 1010. The various electrical device assemblies 1030, 1040, 1050, 1060, and 1070 are shown for purposes of illustrating the versatility of the system 1010 in that various electrical devices can be used. It is to be understood that not all of the various electrical device assemblies 1030, 1040, 1050, 1060, and 1070 are required and a single electrical device assembly can be mounted between a set of studs.

Figure 4:
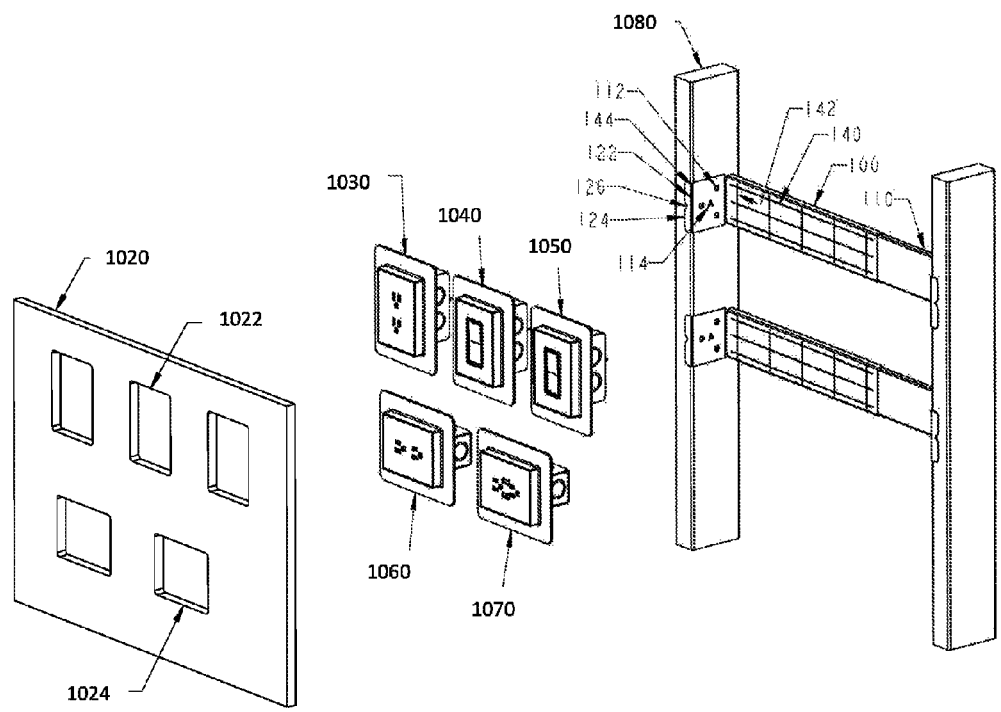
FIG. 4 is an exploded view thereof.
Figure 5:
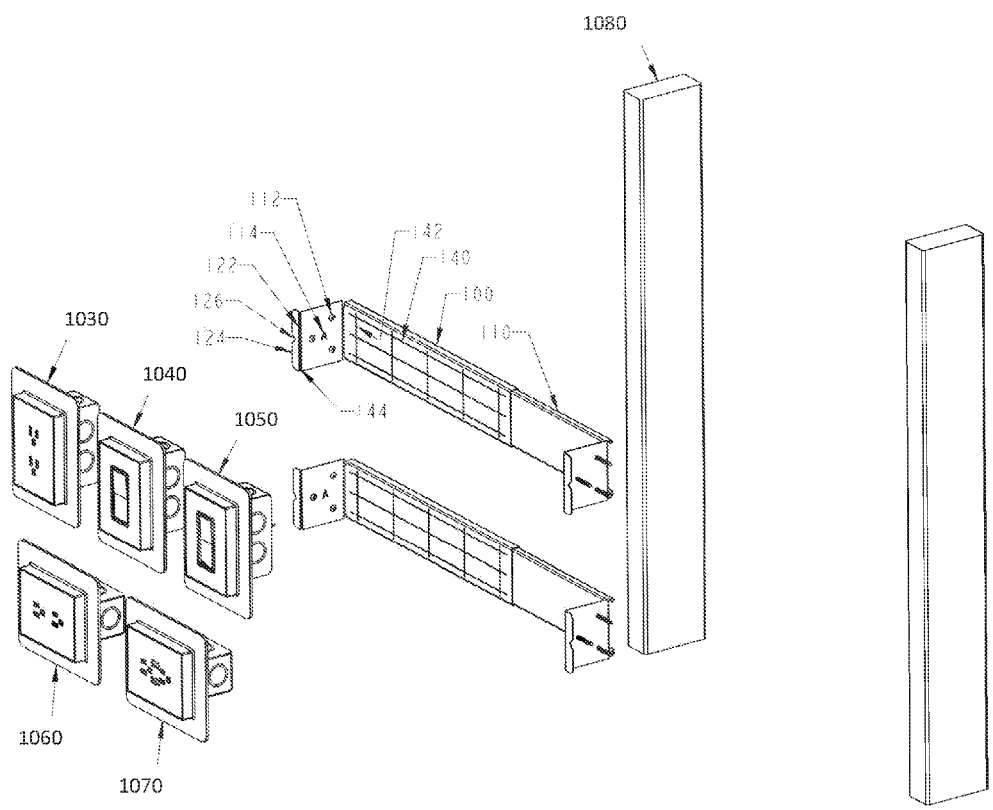
FIG. 5 is an exploded view thereof.

Referring to FIGS. 4-5, the system 1010 is shown in exploded view. The wall board 1020 includes cutouts 1022 and 1024 that are sized and shaped to receive the various electrical device assemblies 1030, 1040, 1050, 1060, and 1070. Cutout 1022 is vertically oriented and cutout 1024 is horizontally oriented for receiving electrical device assemblies in various orientations. The system 1010 includes brackets 100, 110 that extend between the studs 1080 and attach thereto. As discussed in more detail below, the brackets 100, 110 are supported by the studs 1080, the electrical device assemblies 1030, 1040, 1050, 1060, and 1070 are supported by the brackets 100, 110, and the wall board 1020 is supported by the studs 1080. As discussed in more detail below, an advantage of the system 1010 is that the electrical device assemblies can be mounted substantially flush with the wall board 1020 to provide a nearly seamless, aesthetically pleasing appearance.

Figure 6:
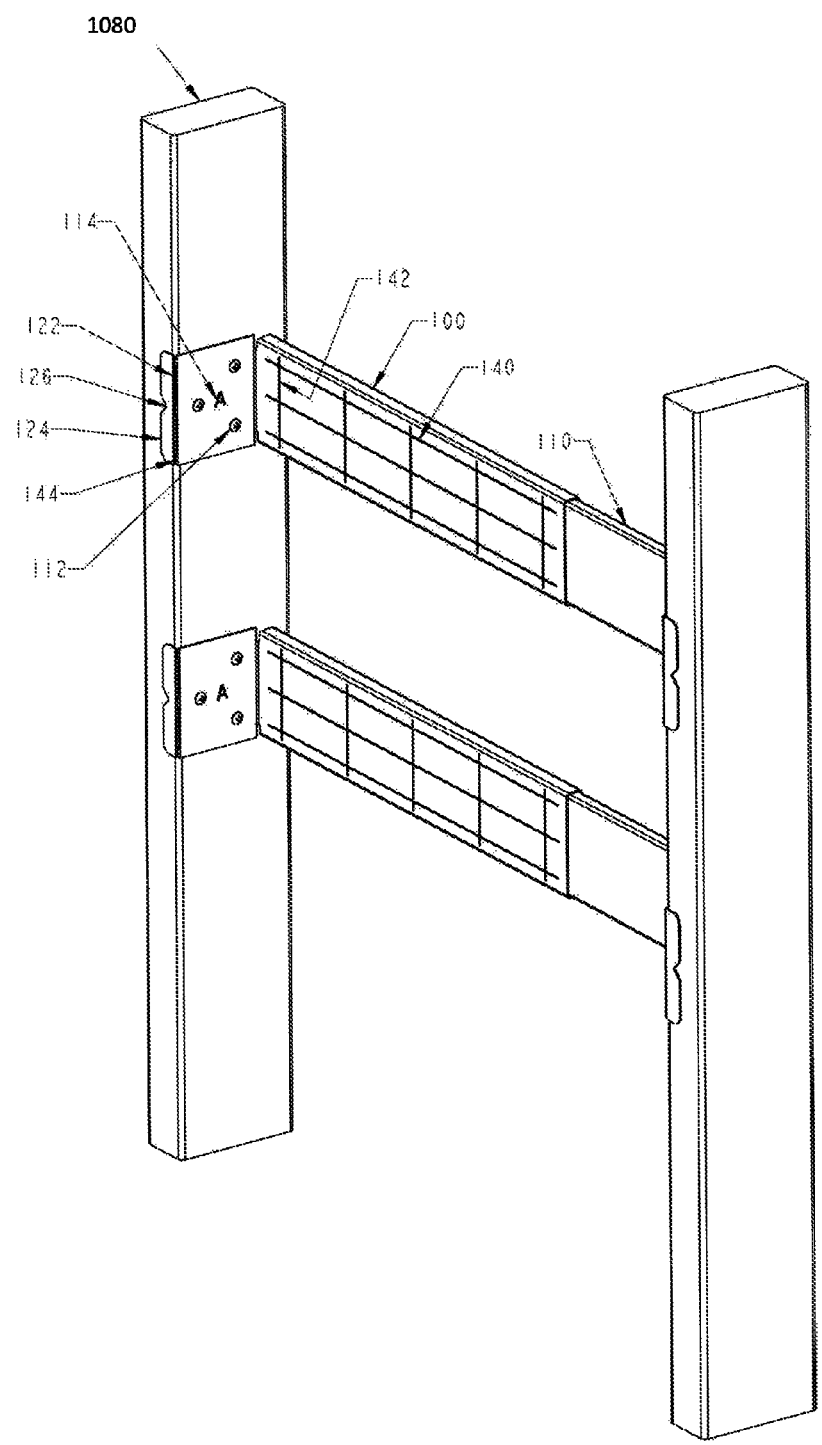
FIG. 6 is a front perspective view of a bracket assembly thereof.
Figure 7:
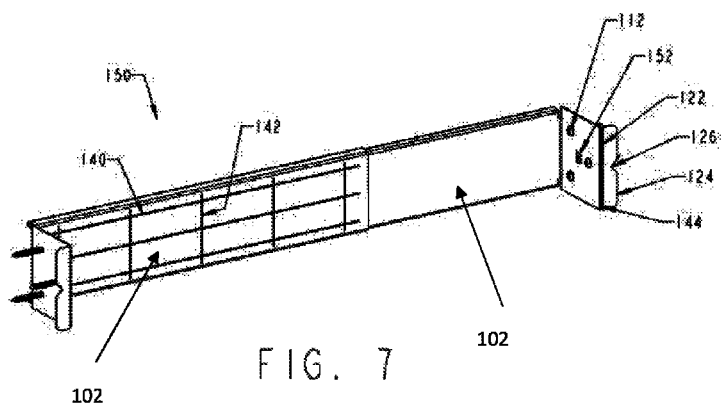
FIG. 7 is a perspective view of the bracket assembly thereof.
Figure 8:
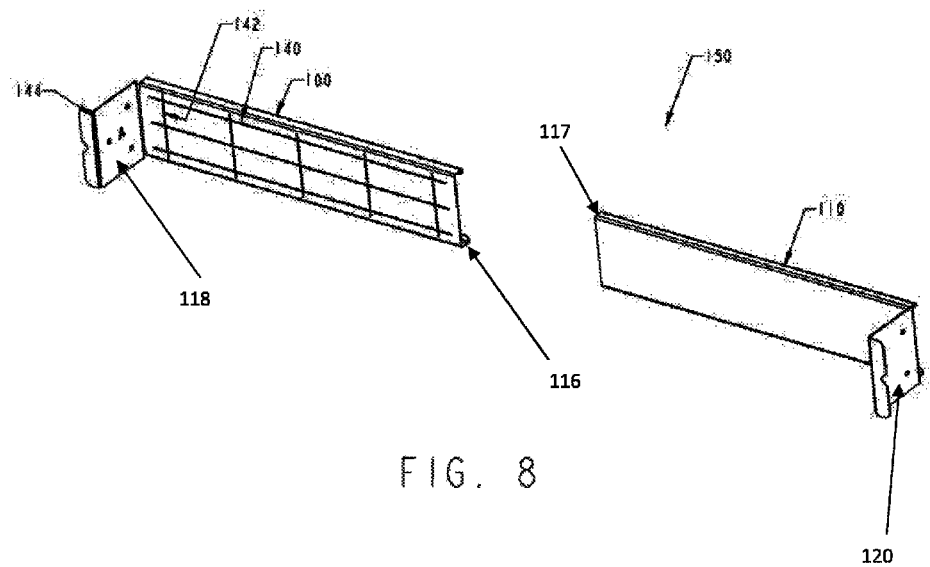
FIG. 8 is an exploded perspective view of the bracket assembly thereof.

Referring to FIGS. 6-8, bracket assembly 150 having brackets 100, 110 is described in more detail. Assembly 1014 shows the brackets 100, 110 mounted between adjacent studs 1080 in a typical building wall. The brackets 100 and 110 are sized and shaped to permit them to slide with respect to each other so that they can extend or retract to fit between studs 1080 of various spacings. For example, while typical stud spacing in residential building construction is 16 inches on center, the studs can have various spacing and the sliding capability of the brackets permits the brackets to accommodate the various spacings, including also spacings that only approximate 16 inches on center but are irregular. The bracket 100 can have a C-channel section 116 that is sized and shaped to slidingly receive a smaller C-channel 117 of bracket 110. As such, bracket 110 can slide with respect bracket 100 while also being retained in the vertical and horizontal directions. In addition, the C-channels themselves provide rigidity against bending in both the vertical and horizontal directions. As discussed in more detail below, the rigidity in the horizontal direction is useful in helping maintain the electrical device assemblies in position with respect to the wall board 1020. In addition to the C-channels 116, 117, the brackets can be provided with additional bends, ridges, etc. that increase the rigidity of the brackets.

The brackets 100, 110 can include flanges 118, 120 that can rest against the studs 1080 with the brackets 100, 110 extending therebetween. With the brackets extended between the studs 1080, fasteners 112 can be used to attach the brackets 100, 110 to the studs 1080 via flanges 118, 120. The flanges 118, 120 extend generally perpendicularly between tabs 124 and the mounting surfaces 102 of the brackets. Typically, a user selects the desired height for the mounting of the electrical device assemblies (e.g., closer to the floor for electrical plugs and higher up for switches) and attaches the brackets 100, 110 at that height. The brackets can include notches 126 or other markers that can be used as references points to set the height of the brackets. The brackets can include tabs 124 that assist in setting the mounting depth of the brackets within the stud cavity. The tabs 124 are sized and shaped to reset against a front face of the studs 1080. Accordingly, by resting the tabs 124 against the front face of the studs, the depth of the bracket is set until the brackets can be permanently attached using fasteners 112. Once the brackets are permanently attached, the tabs 124 can be removed by bending the tabs 124 until they break off. The brackets 100, 110 can include slots 122 and score lines 144 in the bracket that weaken the joint and make it easier to bend and break away the tabs 124 from the brackets. Removal of the tabs 124 prior attachment of the wall board 1020 helps improve the attachment of the wall board to the studs and improves flush attachment. As an optional alternative to tabs 124, the brackets can include markings that can be used to ensure that brackets are mounted at the proper depth with respect to the front face of the studs 1080. The bracket can also include score lines 140 and 142 that help mounting of the electrical device assemblies in vertical and horizontal alignment.

Figure 10:
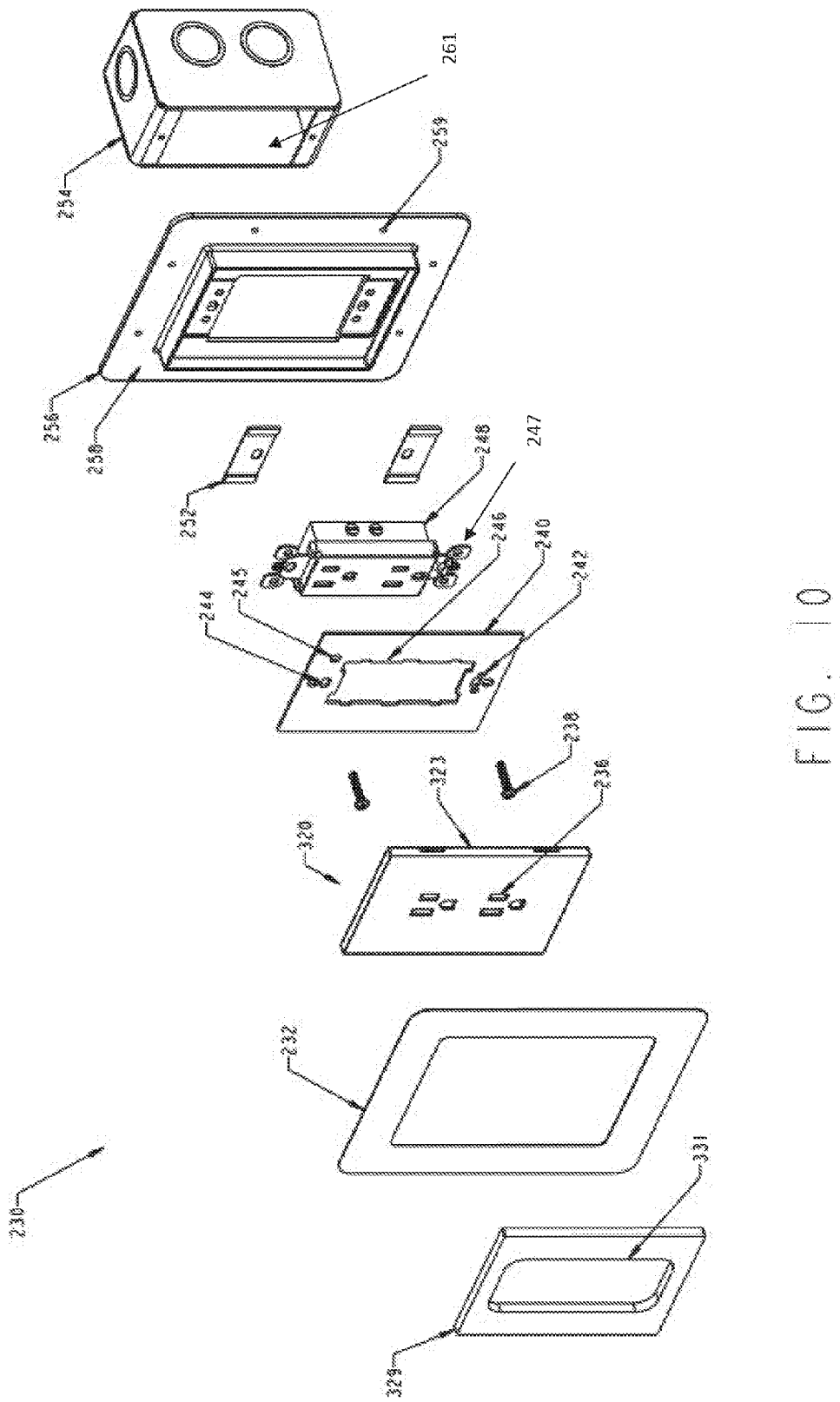
FIG. 10 is an exploded view of one variation of an electrical assembly thereof.
Figure 11:
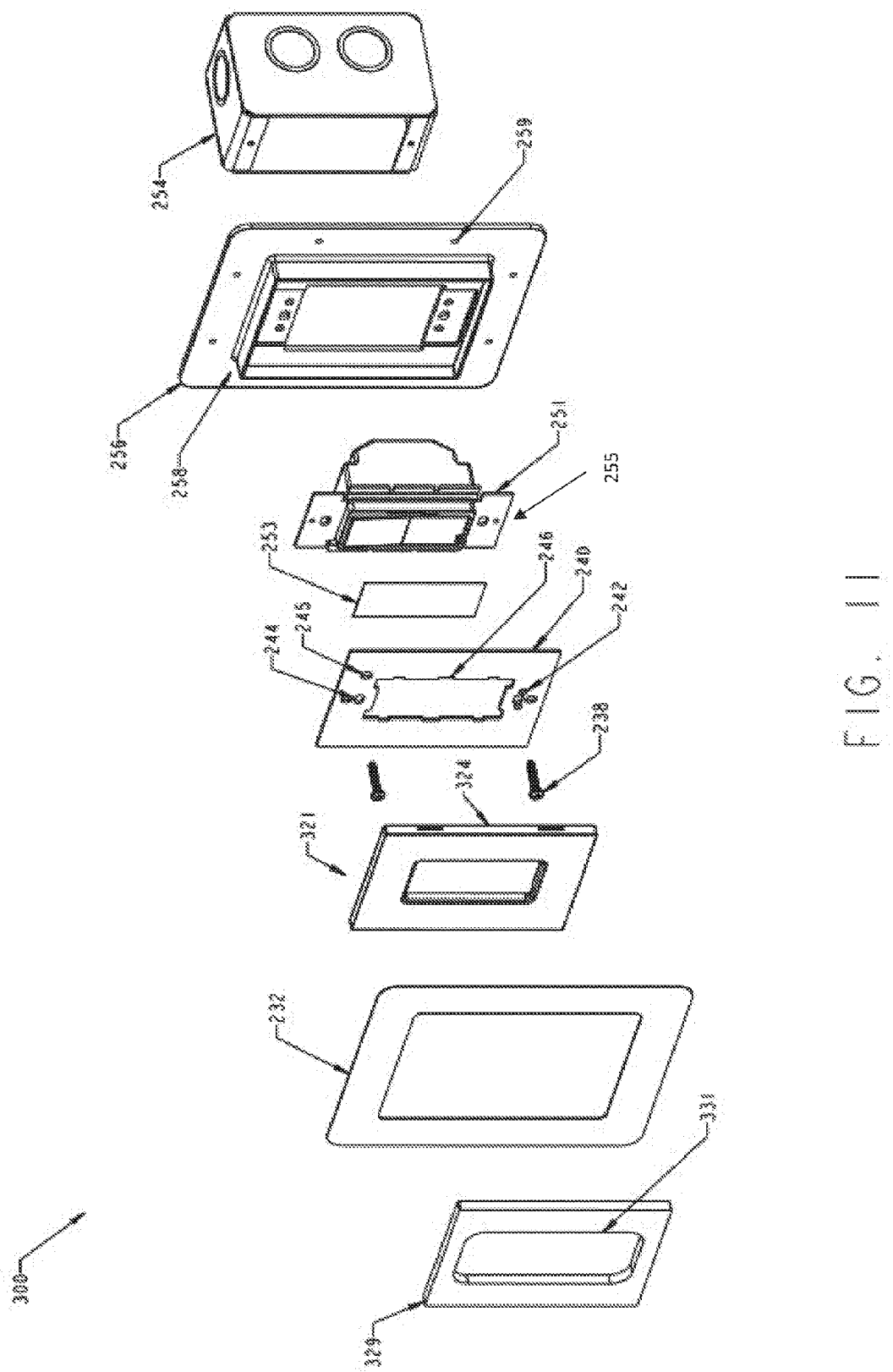
FIG. 11 is an exploded view of another variation of an electrical assembly thereof.
Figure 12:
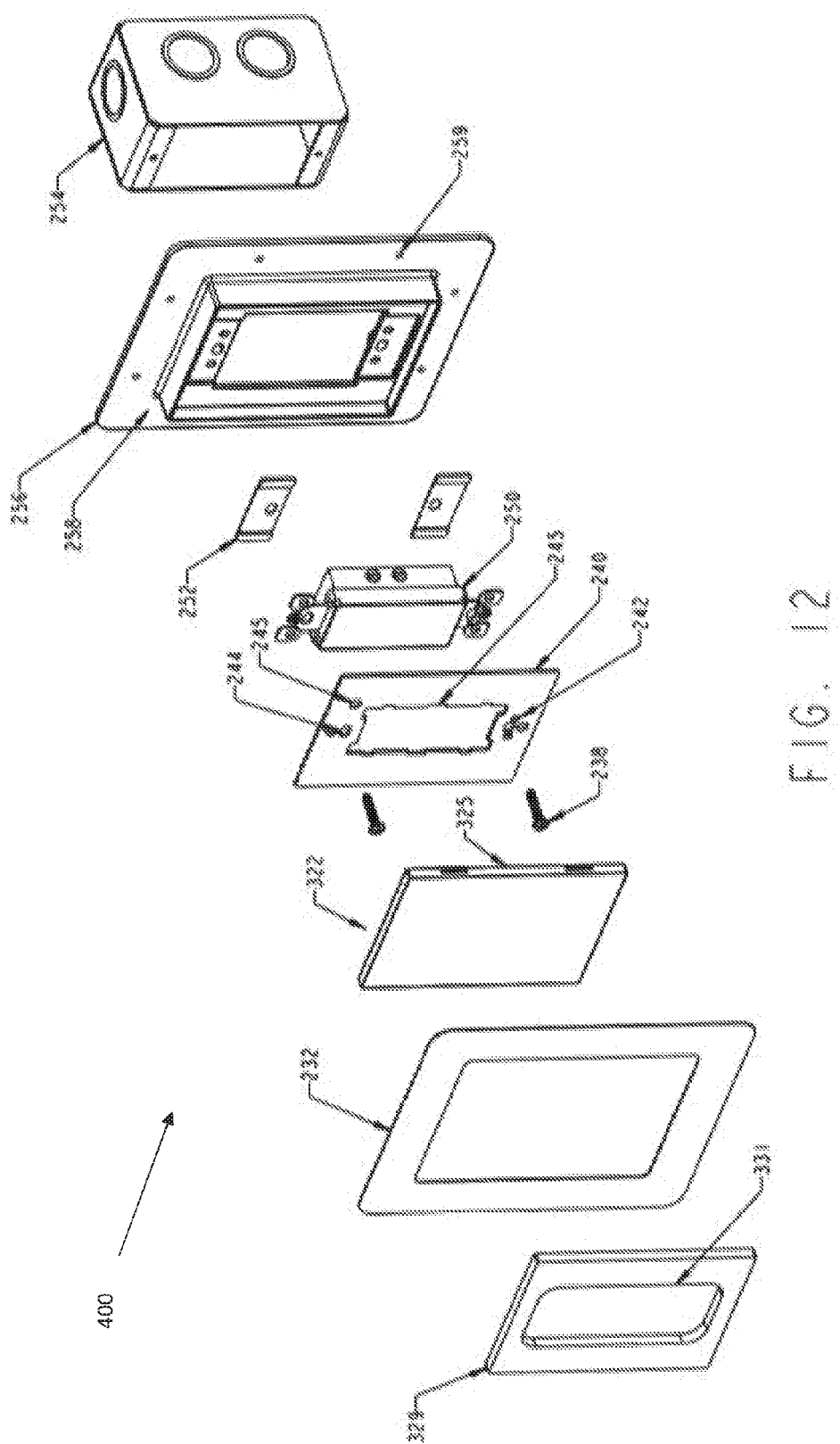
FIG. 12 is an exploded view of another variation of an electrical assembly thereof.

Referring now to FIGS. 10-12, exploded views of electrical device assemblies, which are representative of the electrical device assemblies 1030, 1040, 1050, 1060, and 1070 discussed above, are shown. FIG. 10 illustrates an electrical device assembly 230 that includes an electrical receptacle 248. FIG. 11 illustrates an electrical device assembly 300 that includes a rocker type switch having a dimmer 251. FIG. 12 illustrates an electrical device assembly 400 that includes a concealed switch 250. The electrical device assemblies 230, 300, and 400 share various common parts that share the same reference numerals. Accordingly, the electrical device assemblies will be discussed with reference to assembly 230 of FIG. 10 with the differences in the assemblies of FIG. 11 and FIG. 12 discussed separately.

Figure 17:
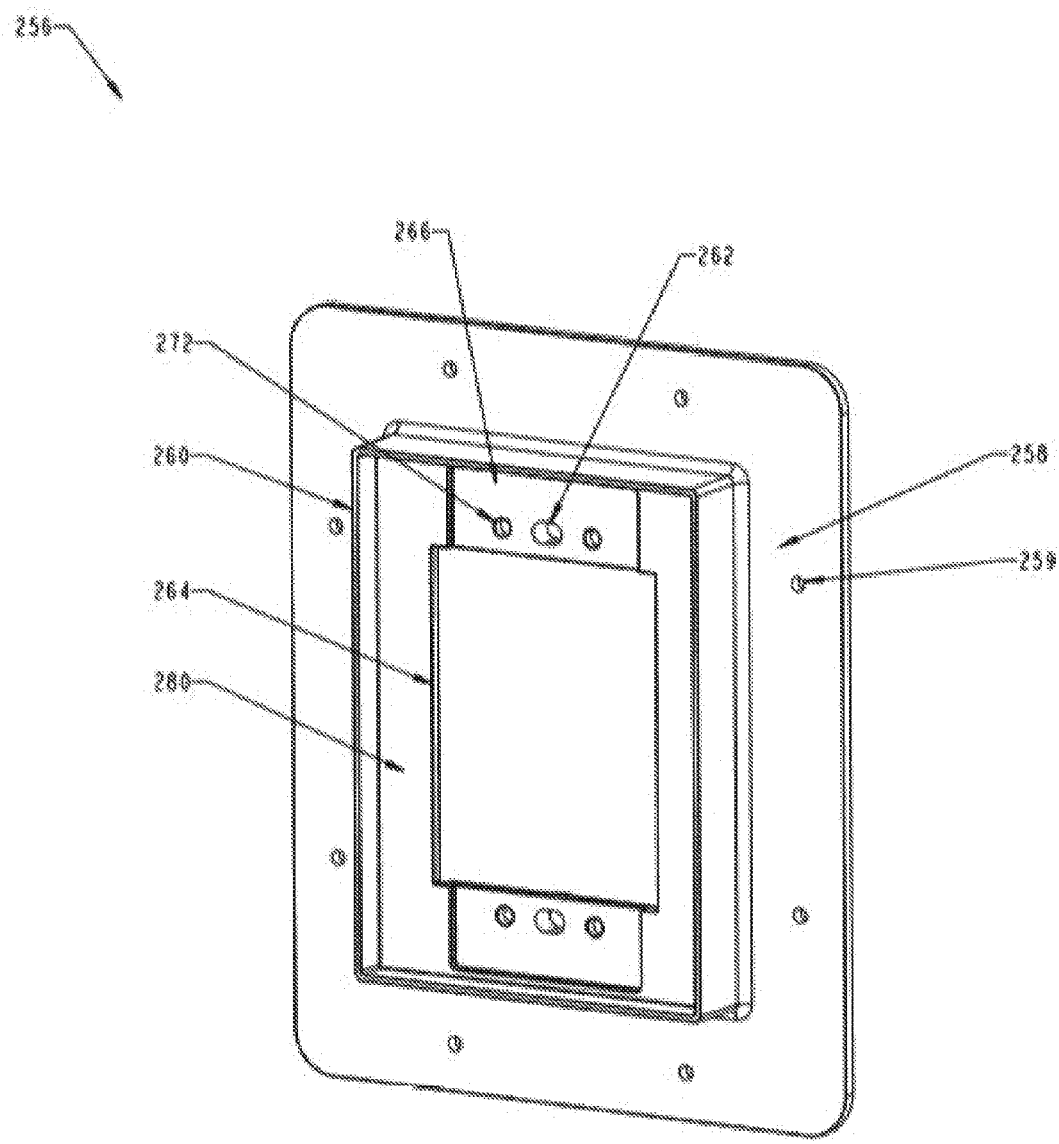
FIG. 17 is a front perspective view of a base plate thereof.

Electrical device assembly 230 includes a typical electrical box 254. The electrical box 254 can be a convention metal and/or plastic electrical box that can be used for housing electrical devices, such as receptacles and switches of the types that are used in building construction, for example. A front surface of the electrical box defines an opening 261 which is oriented toward the wall board 1020. A base plate 256 is provided and is attached the electrical box 254 adjacent the opening 261 via fasteners 238, as discussed in more detail below. The base plate 256, which is shown in FIG. 10 and illustrated in more detail in FIG. 17, includes a flange 258 that provides an increased surface area portion for receiving adhesive 232 so that the wall board can be bonded to the flange 258. The flange 258 can include holes 259 that can permit excess adhesive 232 to ooze out into the holes and/or provide holes for receiving fasteners. The adhesive 232 can be a liquid/gel-type adhesive (e.g., such as a typical glue, adhesive, epoxy, etc.) that is applied to the flange 258 as a bead line. The adhesive can then be sandwiched between the flange 258 and the wall board under pressure to assume the shape as shown in FIG. 10 to provide coverage over the surface of the flange 258.

The base plate 256 includes a connector recess 266 for receiving a spacer 252 that can be used as an adapter that permits attachment of electrical components that include mounting tabs 247 that have a lobe-type configuration. The base plate 256 can include holes 272 for mounting the spacer 252 to the base plate with fasteners. The base plate 256 further includes mounting holes 262.

The base plate 256 includes an opening 264 for receiving the electrical component 248 so that the electrical component 248 can be attached to the base plate 256 and at least partially extend into the electrical box 254 so that electrical service wires can be attached to the electrical component 248 and wired to connect into the building's wiring system.

Figure 15:
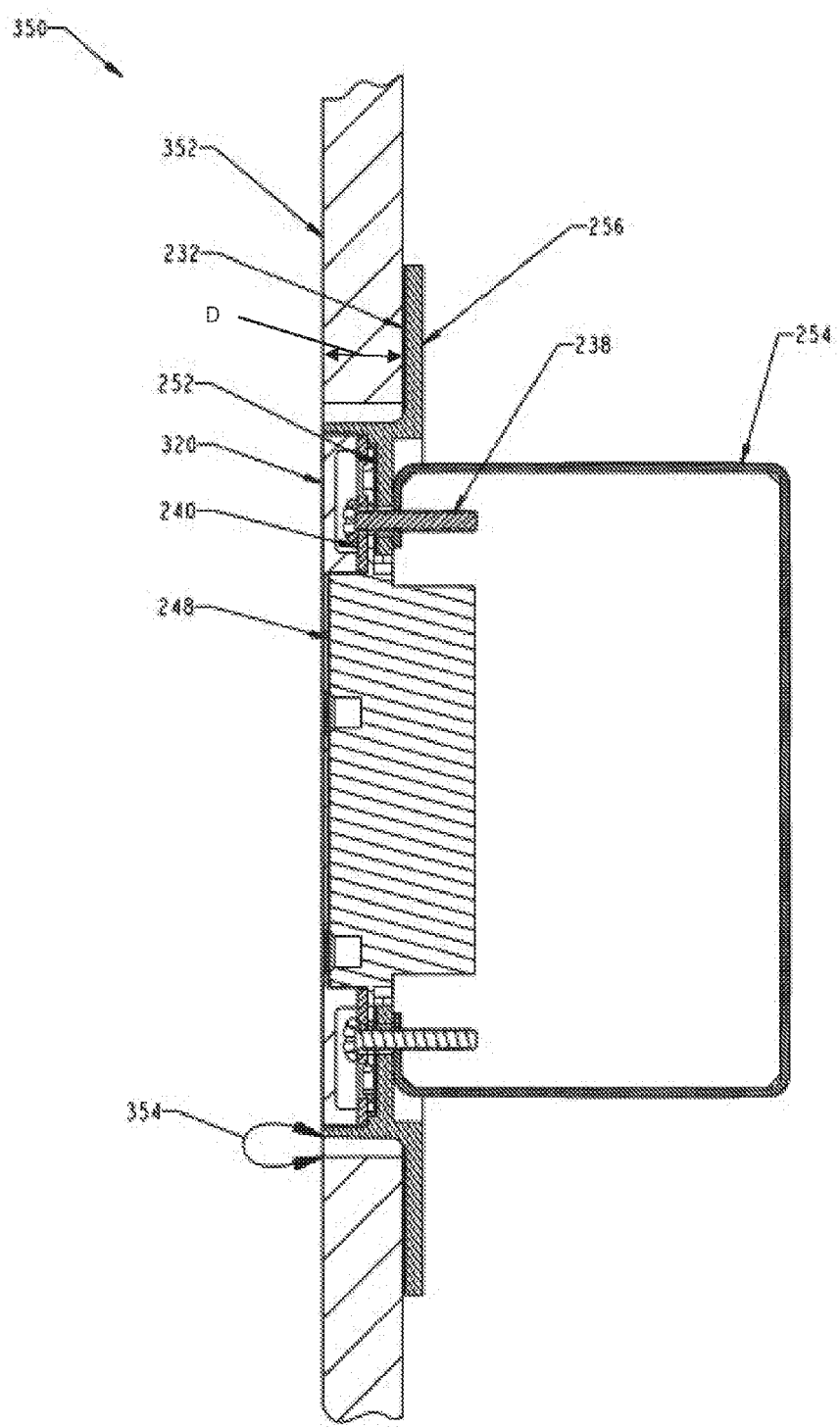
FIG. 15 is a cross-section view of an electrical assembly thereof attached to a wall board of a first thickness.

The base plate 256 includes a ring 260 that defines a recess 280 for receiving a metallic backer plate 240. The backer plate 240 includes an opening 246 that is sized and shaped to permit at least a front portion of the electrical receptacle 248 to extend at least partially through the backer plate 240. The backer plate 240 can optionally include a clearance hole 242 for providing access to features on some electrical devices and/or a viewing hole 245 that can permit light to pass through the backer plate 240 if, for example, the electrical device includes indicator lights. The backer plate 240 includes mounting holes 244 for receiving fasteners 238. Accordingly, the backer plate 240, electrical receptacle 248, spacers 252, base plate 256, and electrical box 254 can be assembled by inserting fasteners 238 through the respective, corresponding mounting holes in each of these components, as can be seen in FIG. 15, which shows the assembly in cross-section.

A cover plate assembly 320 is provided that includes a cover plate 323. The cover plate 323 includes holes 236 that correspond to the receptacle 248 so that the prongs of an electrical plug can be passed through the cover plate 232 and into engagement with the receptacle 248. The cover plate 323 can have a reduced thickness in the area of the holes 236 so that the thickness of the cover plate does not interfere with the electrical connection between the prongs of a plug and the receptacle 248. The cover plate 323 includes slots 326 for receiving magnets 327 for magnetically coupling the cover plate assembly 320 to the backer plate 240. The slots 326 are located (e.g., on a side surface or rear surface) so that they are not visible from a front face of the cover plate 323 (e.g., the slots are hidden when the cover plate is received in the recess 280). The backer plate 240 is made from a magnetically responsive material so that the magnets 327 can provide a magnetic holding force between the cover plate assembly 320 and the backer plate 240. Accordingly, the cover plate assembly 320 can be magnetically mounted to the backer plate 240 and can be decoupled from the backer plate 240 upon application of a force sufficient to overcome the magnetic coupling force. The use of magnets eliminates the need for a traditional fastener (e.g., screw or bolt) that typically require that the fastener be visible so that the fastener can be manipulated (e.g., turned with a screw driver) for engagement. This visibility of the fastener would detract from the aesthetic appearance of the cover plate assembly. Magnets, which do not require manipulation for engagement, can be blindly received is receptacles in a non-visible manner. Accordingly, the cover plate assembly 320 can be attached without visible fastening means, which would detract from the aesthetic appearance.

As discussed in more detail below, the assembly 230 can include a mask plate 329 which is provided as part of a kit for installation of the assembly. During installation of the assembly 230 to the wall board 1020, a wall board compound (e.g., spackle, joint compound, plaster, mud, etc.) is applied adjacent to the assembly 230 to provide a seamless transition between the wall board 1020 and the assembly 230. The mask plate 329 can be applied over the backer plate 240 in place of the cover plate assembly 320. After the compound has be applied and finished, the mask plate 329 can be removed and discarded and the cover plate assembly 320 can be replaced. The mask plate 329 provides protection during the compound application process and prevents the cover plate assembly from exposure to the compound. The mask plate can include an aperture 331 the assists with the application of the compound by providing a relief space.

As discussed above, electrical device assembly 300 shown in FIG. 11 is similar to the electrical device assembly 230 shown in FIG. 10 except that electrical device 251 is a rocker switch. As can be seen, the rocker switch 251 has a rectangular-shaped connector tab 255. The connector recess 266 in the base plate 256 is sized and shaped to receive rectangular-shaped connector tabs. Accordingly, spacers 252 can be omitted. In addition, cover plate assembly 321 has an opening 328 that is sized and shaped to receive the rocker switch 251 and provide access to operate the rocker switch. An adhesive backed sticker 253 can also be provided to cover the rocker switch 251. The adhesive backed sticker can be applied to the rocker switch 251 and then painted with the rest of the wall during finishing.

As discussed above, electrical device assembly 400 shown in FIG. 12 is similar to the electrical device assembly 230 shown in FIG. 10 except that electrical device 250 is a concealed switch. Concealed switch 250 can be operated with a remote control and/or through a touch sensitive sensor. Accordingly, direct access to the switch is not required. As such, cover plate assembly 322 can be provided without a central access opening.

Figure 13:
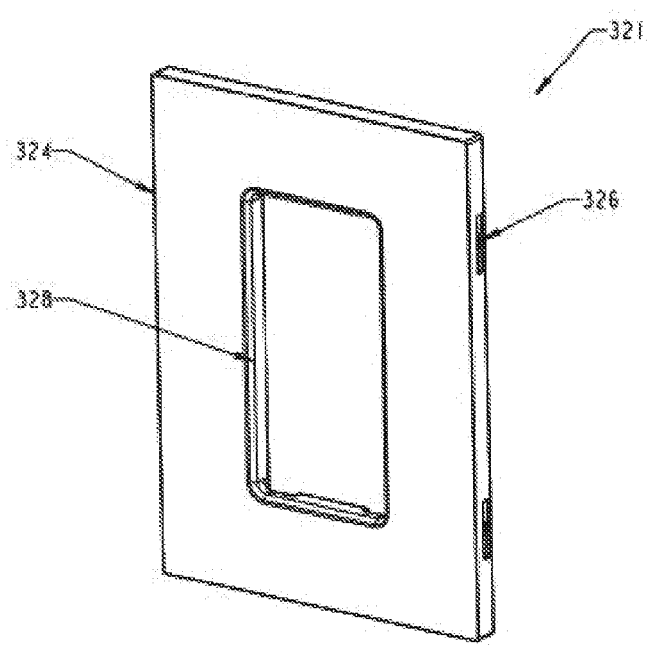
FIG. 13 is a front perspective view of a cover plate assembly thereof.
Figure 14:
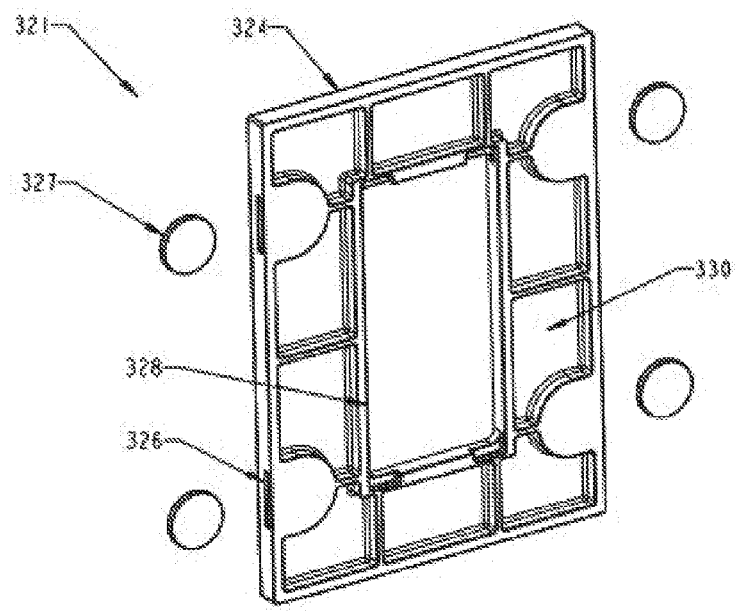
FIG. 14 is a rear perspective view of a cover plate assembly thereof.

Referring now to FIGS. 13 and 14, the cover plate assembly 321 is described in more detail. The cover plate assembly 321 includes a cover plate 324. The cover plate 324 includes recessed receptacles 326 located about the periphery of the cover plate 324 having opening along the side edge of the cover plate 324. The recesses 326 are sized and shaped to receive magnets 327. The cover plate 324 includes a central aperture 328 that is sized and shaped to correspond to the electrical device being used. The cover plate 324 can be made from plastic, for example, and can include voids 330 that improve the manufacturability of the cover plate 324 (e.g., by injection molding).

Referring to FIG. 15, electrical device assembly 230 is shown mounted with respect to a ½ inch thick wall board 352. The base plate 256 is adhesively bonded to a back side of the wall board 352. As can be seen, the distance D between the top edge of the ring 260 and the flange 258 is sized to accommodate the ½ inch thick drywall such that when the flange 258 is adhered to the wall board 352 the top edge of the ring 260 is flush with the opposite, outer surface of the wall board 352. As can be seen, the wall board 352 has an opening that is sized and shaped to receive the ring 260 of the base plate 256 with the opening being slightly oversized provide a peripheral gap 354 between the ring 260 and the edge of the opening in the wall board. The gap 354 provides a space to receive wall board compound during the finishing steps of installation. The application of compound into the gap 354 increases the strength of the compound and reduces the chance of a crack forming in the compound.

Figure 16:
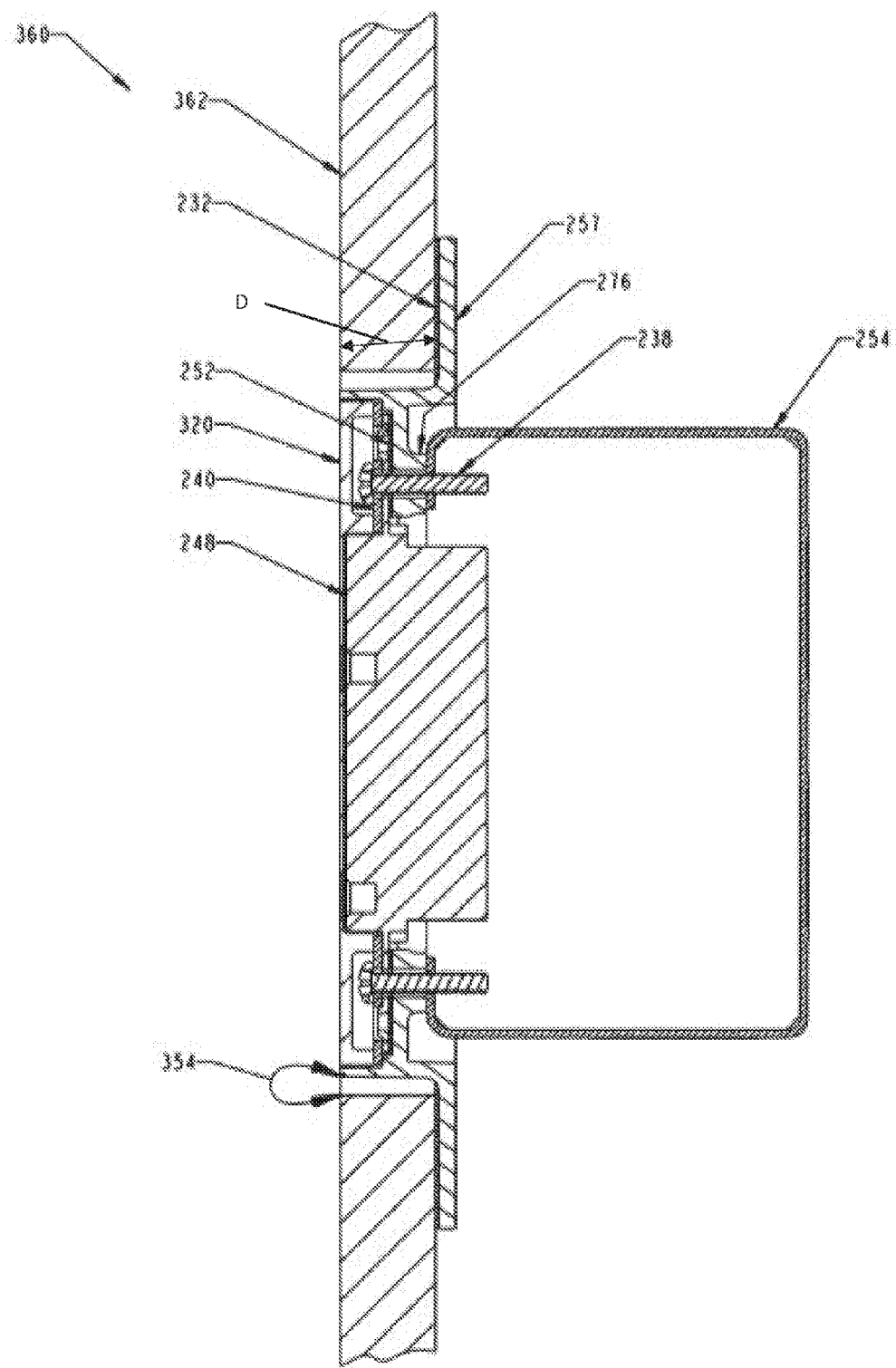
FIG. 16 is a cross-section view of an electrical assembly thereof attached to a wall board of a second thickness.

Referring to FIG. 16, which is similar to the assembly shown in FIG. 15, except that the electrical device assembly 230 is shown mounted with respect to a ⅝ inch thick wall board 362, as another non-limiting example of the structural arrangement of an assembly in accordance with the invention being arranged for mounting to a wall board of prescribed thickness, here, ⅝ inch. The base plate 257 is adhesively bonded to a back side of the wall board 362. As can be seen, the distance D between the top edge of the ring 260 and the flange 258 is sized to accommodate the ⅝ inch thick drywall such that when the flange 258 is adhered to the wall board 362 the top edge of the ring 260 is flush with the opposite, outer surface of the wall board 362. In addition, the base plate 257 includes spacing bosses 276 the extend around the mounting holes. The bosses 276 provided the additional spacing necessary to attached the based plate 257 to the electrical box 254, which is connected to the studs 1080 via brackets 100, 110, as discussed above.

Figure 18:
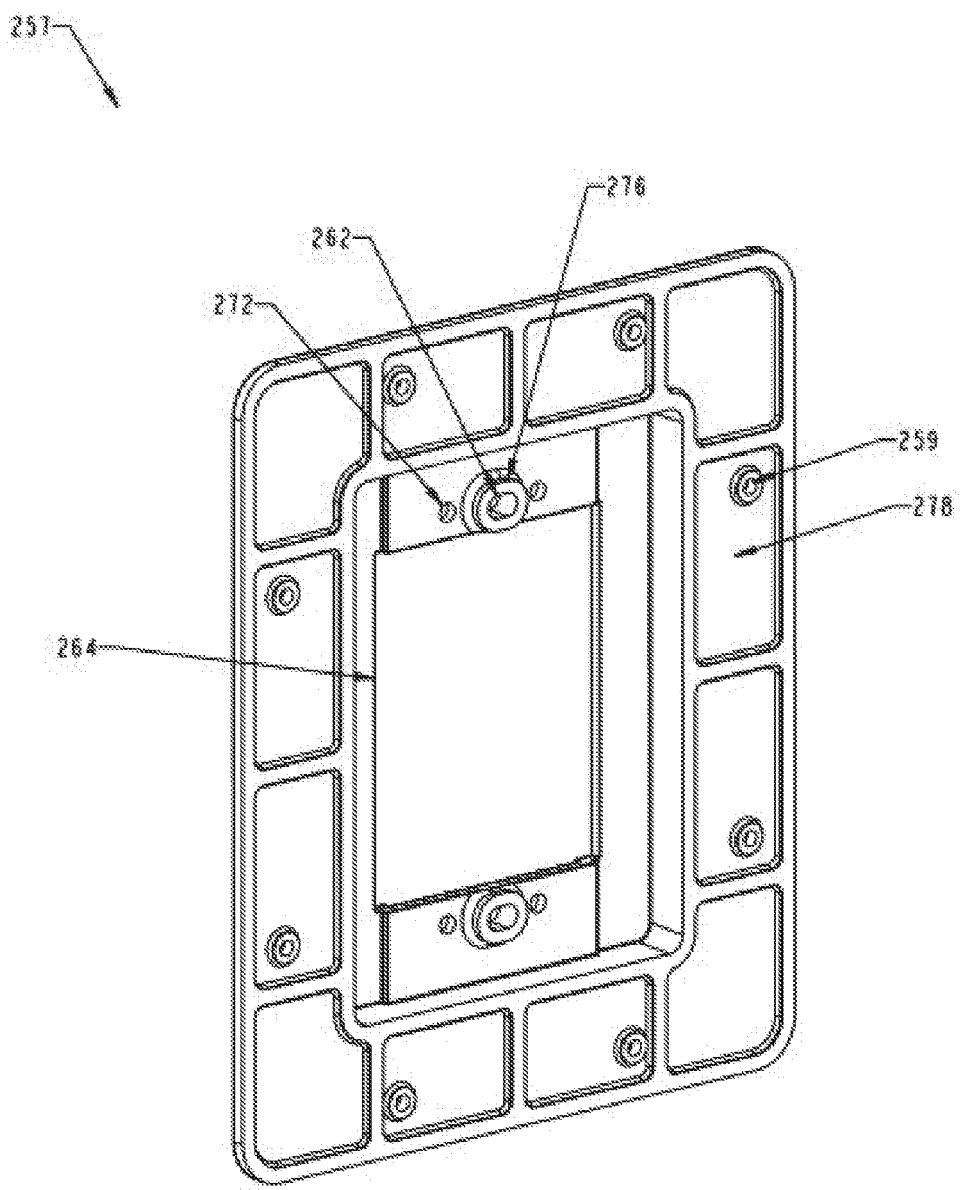
FIG. 18 is a rear perspective view of a variation base plate thereof.
Figure 19:
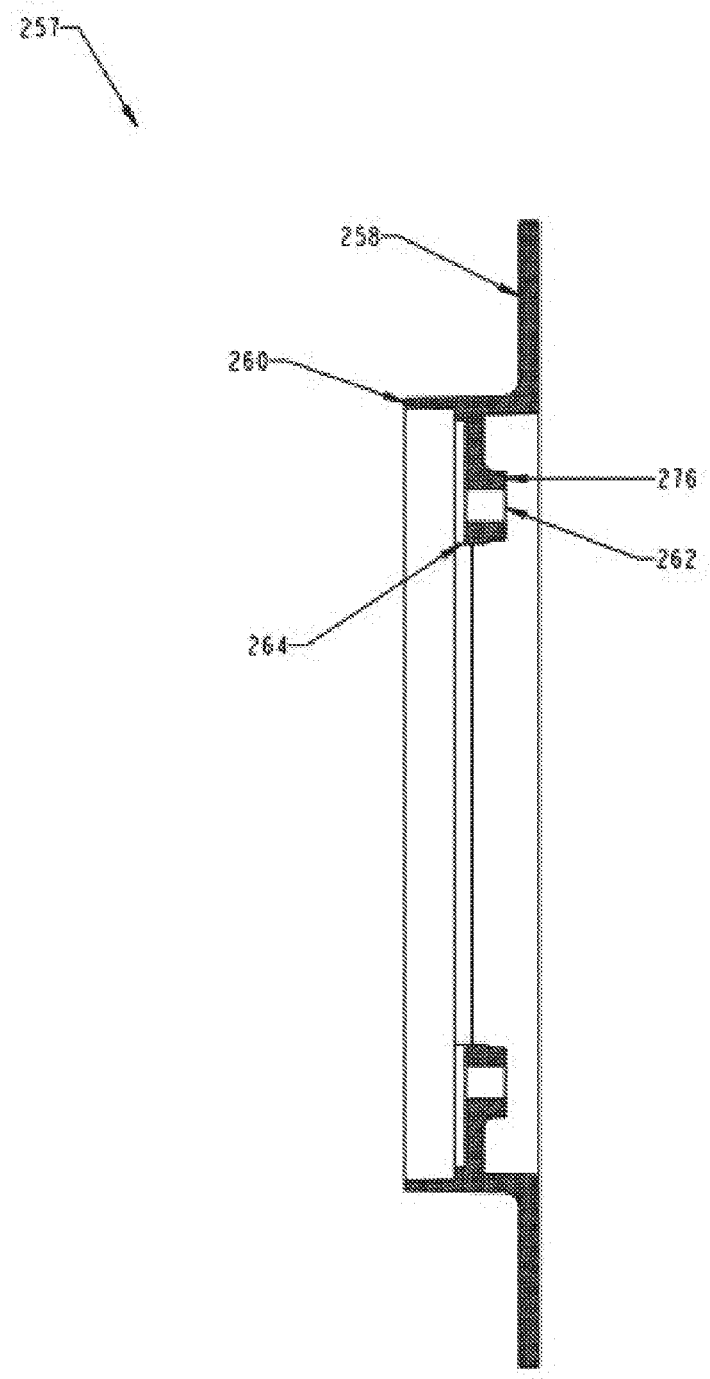
FIG. 19 is a cross-section view of the variation base plate thereof.

Referring now to FIGS. 18 and 19, the base plate 257, which is sized to accommodate ⅝ inch wall board, is discussed in more detail. The base plate 257 is similar to base plate 256, except that base plate 257 has a distance between the top edge of the ring 260 and the flange 258 that is sized to attach to ⅝ inch thick wall board, and more generally, a base plate can be constructed with flanges sized to suit a prescribed thickness of wallboard. The base plate 257 also includes spacing bosses 276 about the mounting holes 262 that permit proper attachment of the base plate 257 to the electrical box 254. The base plate can be made from plastic, for example, and can include voids 278 that improve the manufacturability of the base plate (e.g., by injection molding).

Figure 9:
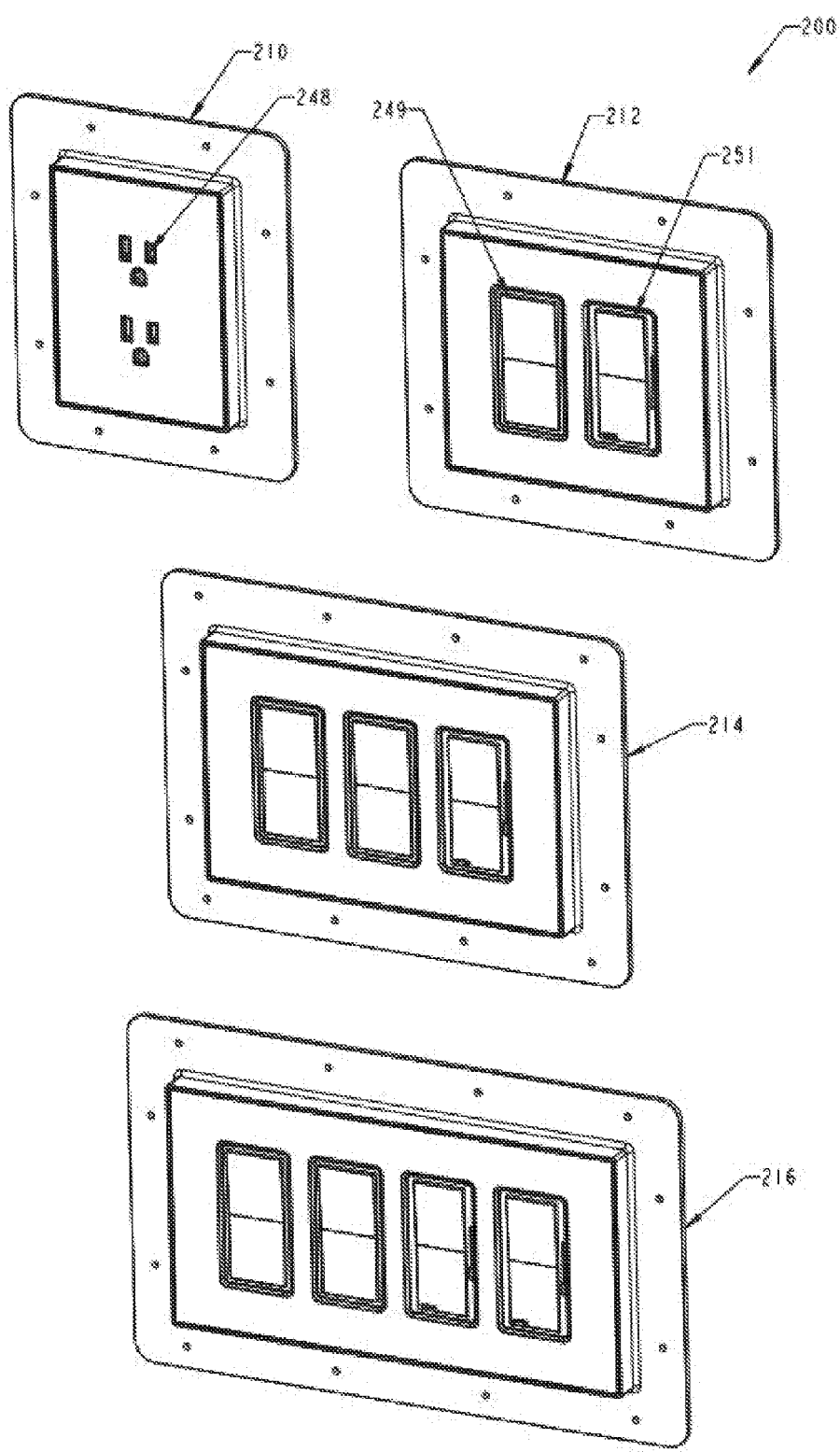
FIG. 9 illustrates several variations of an electrical assembly thereof.

Referring to FIG. 9, the system can be modified to accommodate one gang 210, two gang 212, three gang 214, and four gang 216 configurations. The various components of the system, such as the base plate 256, backer plate 240, and cover plate assembly 320 can be modified in terms of size, shape, and corresponding openings to accommodate multiple electrical devices of various combination (e.g., various combination of varieties of switches and/or receptacles). Accordingly, the system of the present invention can be used to meet the needs of a building's electrical system.

In regard to the construction of assemblies described in connection with FIGS. 1-19, a method of installing the system of the present invention has the bracket 110 inserted into the C-channel 116 of bracket 100 for sliding engagement. The brackets 100, 110 are extended between adjacent studs 1080 and positioned at a desired height. The tabs 124 are seated against the front faces of the the studs 1080, which automatically positions the brackets at a prescribed (and proper) depth with respect to the studs 1080. With the brackets extended between the studs 1080 at the prescribed depth and at the desired height, the brackets can be attached to the studs using fasteners 112. With the brackets 100, 110 attached to the studs, the tabs 124 can be bent along score lines 144 and slots 122 until the tabs 124 break away from the brackets. The tabs 124 can then be discarded.

The electrical box 254 can be attached to the brackets 100, 110 via suitable fasteners 113 (e.g., sheet metal screws) that extend through a rear wall of the electrical box 254 and into the brackets 100, 110. The electrical box 254 can be mounted directly to the brackets 100, 110 and be supported thereby without having to attach the electrical box 254 directly to a stud. The electrical box 254 can be mounted at any location along the mounting surface 102 of the brackets, which provides for great versatility of placement locations between the studs 1080. The brackets can include vertical and horizontal reference lines 140, 142 to help ensure that the electrical box 254 is mounted in horizontal and vertical alignment. An electrical device, such as receptacle 248, is provided along with a corresponding base plate 256 (for ½ wall board installations, or base plate 257 for ⅝ inch wall board installations), and cover plate assembly 320. The building's electrical wires can be introduced into the electrical box 254 and connected to the receptacle 248 in a conventional manner for making electrical connections. With the mounting holes aligned, the base plate 256 is positioned over the electrical box 254, the spacers 252 (if necessary depending on the type of electrical device being installed) are inserted into the recesses 266 of the base plate 256, the tabs 247 of the electrical device 248 are positioned over the spacers 252, and the backer plate 240 is received within the recess 280 of the base plate 256 and is positioned over the tabs 247 of the electrical device 248. Fasteners 238 are inserted into the mounting holes to connect the backer plate 240, electrical device 248, spacers 252, base plate 256, and electrical box 254 together. This assembly is supported by brackets 100, 110 since the electrical box 254 is connected to the brackets.

A hole 1022 is provided in the wall board 1020 that is sized and shaped to receive the ring 260 of the base plate 256 with a gap 354 between the edge of the hole 1022 in the wall board 1020 and the ring 260. Adhesive 232 is applied to the flange 258 of the base plate 256. The wall board 1020 is then attached to the studs 1080 with the ring 260 of the base plate 256 extending into the hole 1022 in the wall board. The brackets 100, 110 are attached to the studs 1080 at a depth such that when the wall board 1020 is attached to the studs, the flange 258 is urged against the back surface of the wall board 1020. Accordingly, the flange 258 is forced against the wall board 1020 which causes the adhesive 232 to spread along the surface of the flange 258 and adhere to the wall board 1020. Once the adhesive 232 has dried, the adhesive 232 provides a strong mechanical bond between the base plate 256 and the wall board 1020. Since the flange 258 provides a large surface area for receiving adhesive, the bond strength is increased. The urging force between the flange 258 and the wall board 1020 combined with the adhesive 232 results in a strong bond between the base plate 256 and the wall board 1020. Since there is a reduced chance of movement between the electrical assembly 230 and the wall board 1020, there is a reduced chance of separation and/or cracks developing in the finished wall. Moreover, the present system provides advantages over other possible systems in that the hole 1022 provided in the wall board 1020 can relatively approximate the size of a typical hole cut in wall board to accommodate a typical electrical box. This can reduce the amount of labor and skill to finish the wall board with compound as compared to other systems in which a separate wall board filler piece must be created and then the filler piece must be incorporated into the wall board.

The masking plate 329 can be applied over the backer plate 240 and received within the recess 280 of the base plate. Wall compound can be applied to the wall board 1020 to cover wall board fasteners, seams, and other imperfections in the wall board 1020 to provide a smooth surface prior to painting. In the area of the electrical assembly 230, wall compound is applied around the hole 1022 and into the gap 354 between the edge of the hole 1022 and the ring 260. Since the top edge of the ring 260 is substantially flush with the front surface of the wall board 1020, the top edge of the ring 260 provides a guide for the compound application tool (e.g., trowel, spackle knife, etc.). In addition, the masking plate 329 helps to prevent the compound from contaminating the electrical device 248 and provides a further guide for the compound tool. Accordingly, the compound can be applied around the electrical assembly 230 and (with sanding as necessary) provides a substantially smooth, flush, and seamless transition between the wall board 1020 and the electrical assembly 230.

After the wall compound has been applied, the masking plate 329 can be removed from the recess 280. Cover plate assembly 320 can be inserted into the recess 280 and magnetically coupled to the backer plate 240 via magnets 327. The cover plate 323 is sized and shaped to be received within the recess 280 with an outer surface seated flush with the top edge of ring 260 and, as such, seat flush with the wall board 1020. In addition, the cover plate 323 can be sized and shaped to be received within the recess 280 in a tight configuration in order to reduce the size of any gaps between the cover plate 323 and the ring 260. The reduction of any seams enhances the overall seamless look between the wall board 1020 and the electrical assembly 230. Paint can be applied over the wall board 1020 and the cover plate 323.

Since the cover plate 323 and ring 260 of the base plate 256 are flush with the wall, the inclusion of the electrical device assembly 230 has a minimal impact on the overall aesthetic appearance of the finished wall. In addition, since the wall board compound is extended to the wall board to abut the ring 260, there is a near seamless transition between the wall and the electrical device. Further, the application of paint on the wall and the cover plate 323 further serves to reduce the aesthetic impact of the electrical assembly 230 being included in the wall.

The use of the system of the present invention also provides advantages in the electrical installation and wiring process over traditional systems. In a typical electrical installation and wall construction, the connector tabs 247/255 of the various electrical devices (e.g., receptacles, switches, etc.) are used to engage the wall board surface. Accordingly, the electrical device cannot be attached to the electrical box until after the wall board is attached to the studs. However, since many building codes require an inspection of electrical installation work prior to closing up the walls with wall board, a two-step installation and inspection process is typically required. Accordingly, an electrician typically attaches electrical boxes to the wall studs and runs wires into the electrical boxes. At this point, prior to connection of the electrical wires to the electrical devices and prior to attachment of the wall board to the studs, an inspector inspects the rough-in electrical work. If the electrical work passes the rough-in inspection, wall board is then attached to the studs. Now that the wall board is attached, the electrical device can be connected to the wires and attached to the electrical box. At this point, an inspector can perform a final inspection to ensure that the electrical devices have been properly installed. This standard process typically requires an electrician to work on the job site at least two separate times (rough-in installation and final installation) and requires at least two scheduled visits by an inspector (rough-in inspection and final inspection). This two-step process can cause significant delays and increased costs to the installation job and overall construction/remodel project.

In contrast, in the system of the present invention the connector tabs 247/255 of the electrical devices engage the base plate 256 (as opposed to the wall board) and the wall board is applied over the base plate to engage the flange 258 of the base plate 256. Accordingly, the electrical device can be connected to the wires and connected to the base plate 256 and electrical box 254. As such, an inspector is able to inspect the installation of the electrical box, wires, and electrical device prior to installation of the wall board. In the present system, rough-in and final installation can be accomplished at the same time and the rough-in and final inspection can be performed at the same time. This greatly saves time and cost. Once installation and inspection is complete, the wall boards can be attached to the studs and the wall can be finished, as described above. As such, the inventive system offers significant advantages in installation over traditional methods.

Referring now to FIGS. 20-24, a variation of the exemplary embodiment shown in FIGS. 1-19, is shown. The design shown in FIGS. 20-24 is similar to the one shown in FIGS. 1-19 with the primary differences being in bracket design, attachment of the electrical box to the brackets, and the attachment of the cover plate to the base plate, as described in more detail below.

Figure 20:
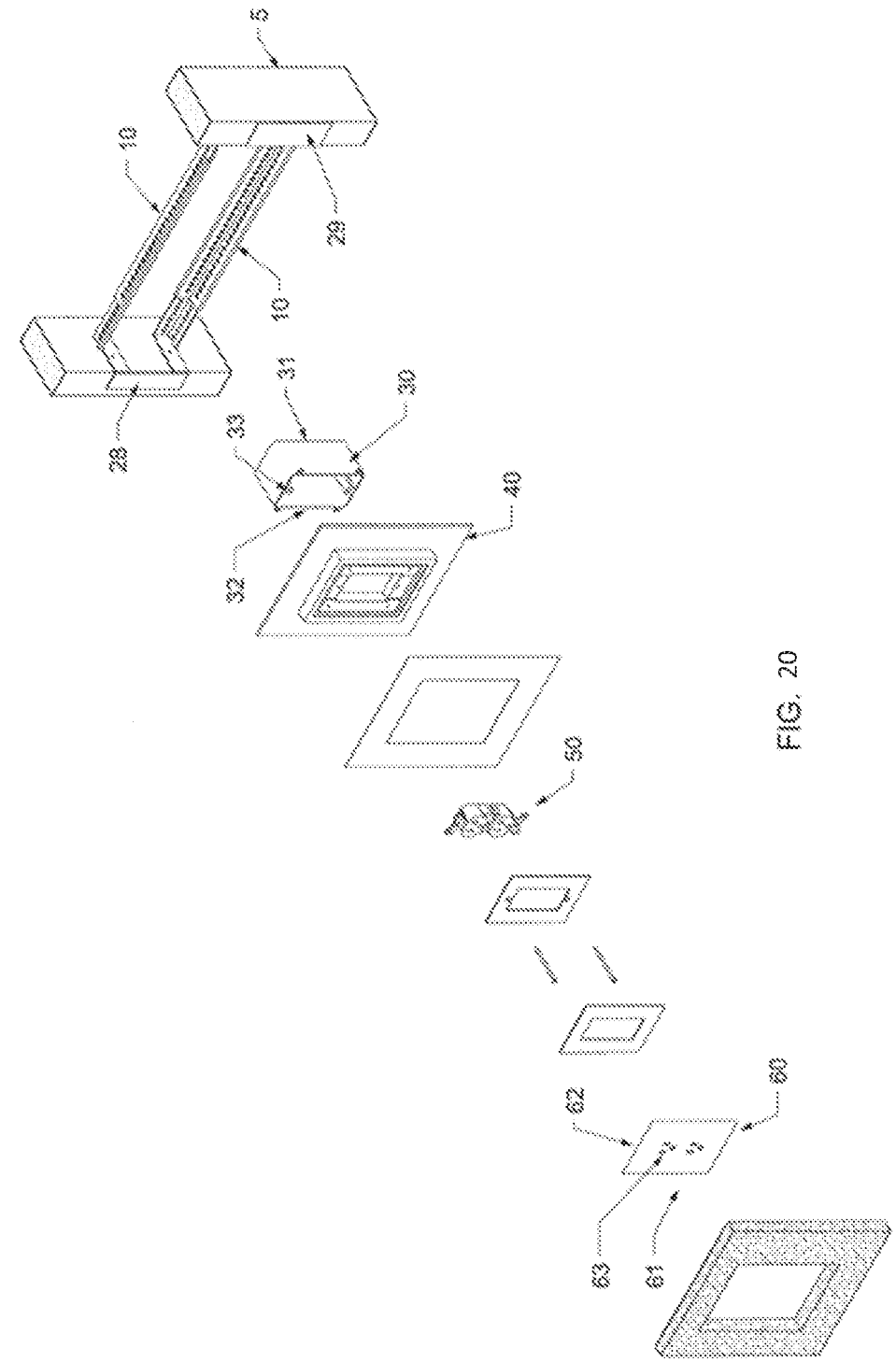
FIG. 20 is an exploded view of another variation of an electrical assembly according to another aspect of the invention.
Figure 21:
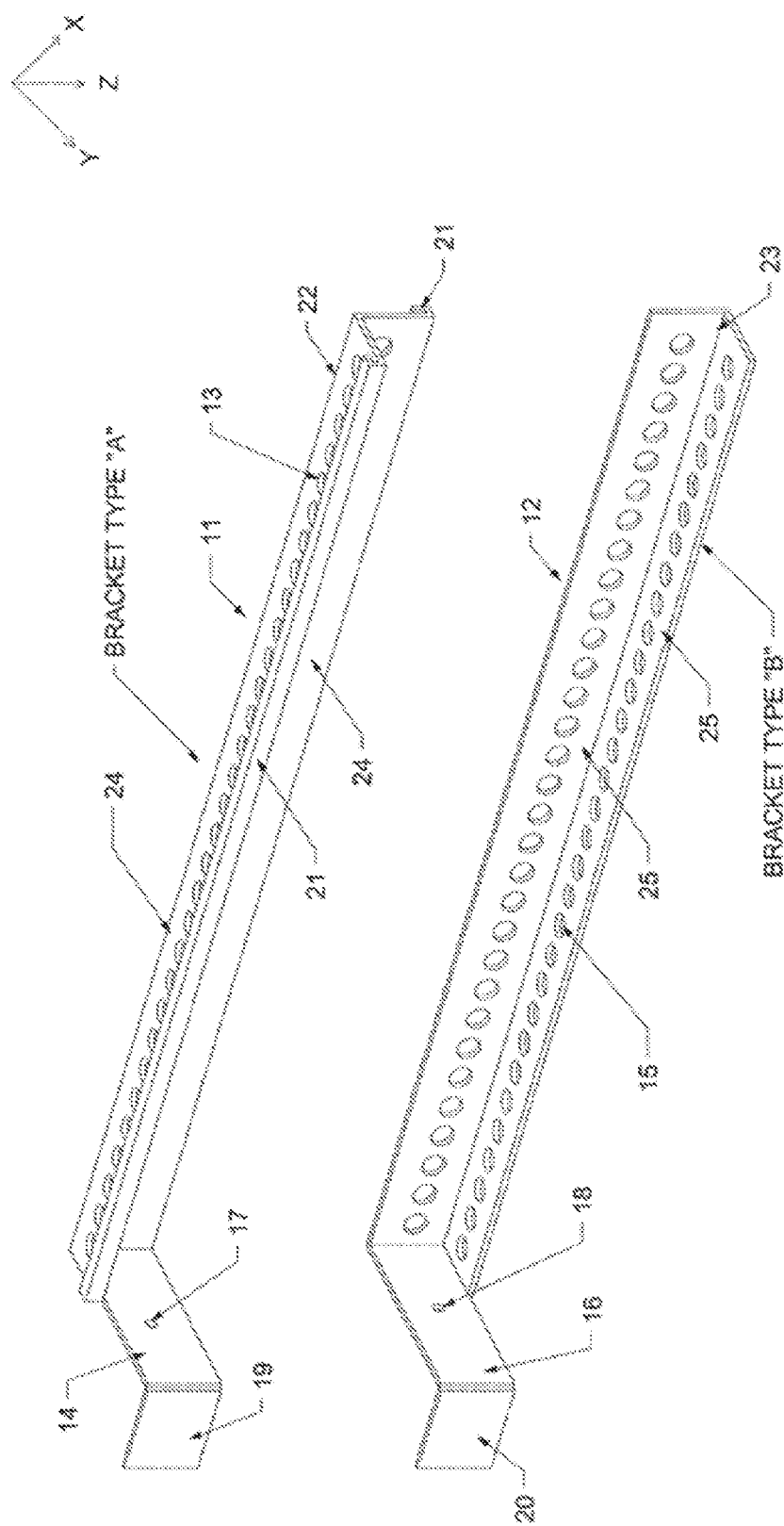
FIG. 21 is a perspective view of the bracket assembly thereof.

Referring to FIGS. 20 and 21, an electrical device mounting system includes a plurality of adjustable brackets 10 disposed on studs 5, an electrical box 30 disposed on the adjustable brackets 10, a base plate 40 disposed on the electrical box 30, an electrical receptacle/switch 50 disposed on the base plate 40, and a cover plate 60 disposed on the electrical receptacle/switch 50. FIG. 1 illustrates an electrical receptacle 50 but an electrical switch 50 may be used instead of the electrical receptacle 50.

Referring to FIG. 21, a pair of adjustable brackets 10 includes a bracket type "A" and a bracket type "B" that may be slidably coupled to each other. The bracket type "A" of a top pair of adjustable brackets 10 and the bracket type "B" of a bottom pair of adjustable brackets 10. As shown in FIG. 24, each of the pair of adjustable brackets 10 (e.g., the top pair of brackets 10 and the bottom pair of brackets 10) includes a bracket type "A" and a bracket type "B" that are slidably coupled to each other.

Referring to FIGS. 20 and 21, the bracket type "A" includes a body 11 extending in a first direction X between two studs 5. The body 11 of the bracket type "A" is bent along the first direction X to have two longitudinal parts 24 joined at a crease 22. Each of the longitudinal parts 24 may include a plurality of fastener holes 13 disposed along the first direction X. The longitudinal parts 24 have widths that extend in directions that cross each other. For example, the longitudinal parts 24 may be perpendicular to each other. In addition, each of the longitudinal parts 24 of a pair of adjustable brackets 10 may include a bent edge 21. The bent edges 21 of a bracket type "A" of a pair of adjustable brackets 10 may be coupled to a bracket type "B" of the pair of adjustable brackets 10 such that the brackets type "A" and "B" can slide on each other along the first direction X without being separated from each other in a second direction Y that crosses the first direction X, or in a third direction Z that crosses the first and second directions X and Y.

The bracket type "A" may include a plate 14 at one end thereof. The plate 14 can include a hole 17. The plate 14 may extend along the second direction Y and may have a break-off tab 19. The length of the plate 14 sets a predetermined depth of a pair of adjustable brackets 10 (e.g., distance along the second direction Y) with respect to a finished exterior surface 81 of a wall 80 (shown in FIG. 24). The break-off tab 19 may be bent along the third direction Z. The break-off tab 19 is used as a guide to set the depth the pair of adjustable brackets 10. The break-off tab 19 may be removed from the plate 14 at the bend along the third direction Z (e.g., where it connects to the plate 14). The hole 17 may be used to fasten the bracket type "A" of the pair of adjustable brackets 10 to a stud 5. For example, the hole 17 may receive a screw, nail, a staple, or other fastening devices, to fasten the plate 14 with a stud 5.

The bracket type "B" includes a body 12 having a crease 23 and two longitudinal parts 25 joined at the crease 23. The longitudinal parts 25 have widths that extend in directions that cross each other. For example, the longitudinal parts 25 may be perpendicular to each other. The body 12 extends along the first direction X and each of the two longitudinal parts 25 may include screw holes disposed along the first direction X.

When a bracket type "A" and a bracket type "B" of a pair of adjustable brackets 10 are coupled with each other, as shown in FIG. 24, the longitudinal parts 25 of the bracket type "B" are disposed on corresponding longitudinal parts 24 of the bracket type "A". In addition, the bent edges 21 of the longitudinal parts 24 restrain the brackets type "A" and "B" from separating from each other (e.g., moving in the second direction Y and the third direction Z) while permitting the brackets type "A" and "B" to slide on each other in the first direction X. Accordingly, a pair of adjustable brackets 10 including the brackets type "A" and "B" has increased structural strength. In addition, the length of a pair of adjustable brackets 10 may be adjusted along the first direction X such that it can be fastened to two studs 5. In addition, the screw holes 14 and the screw holes 15 may correspond to each other when a bracket type "A" is coupled with a bracket type "B".

Figure 22:
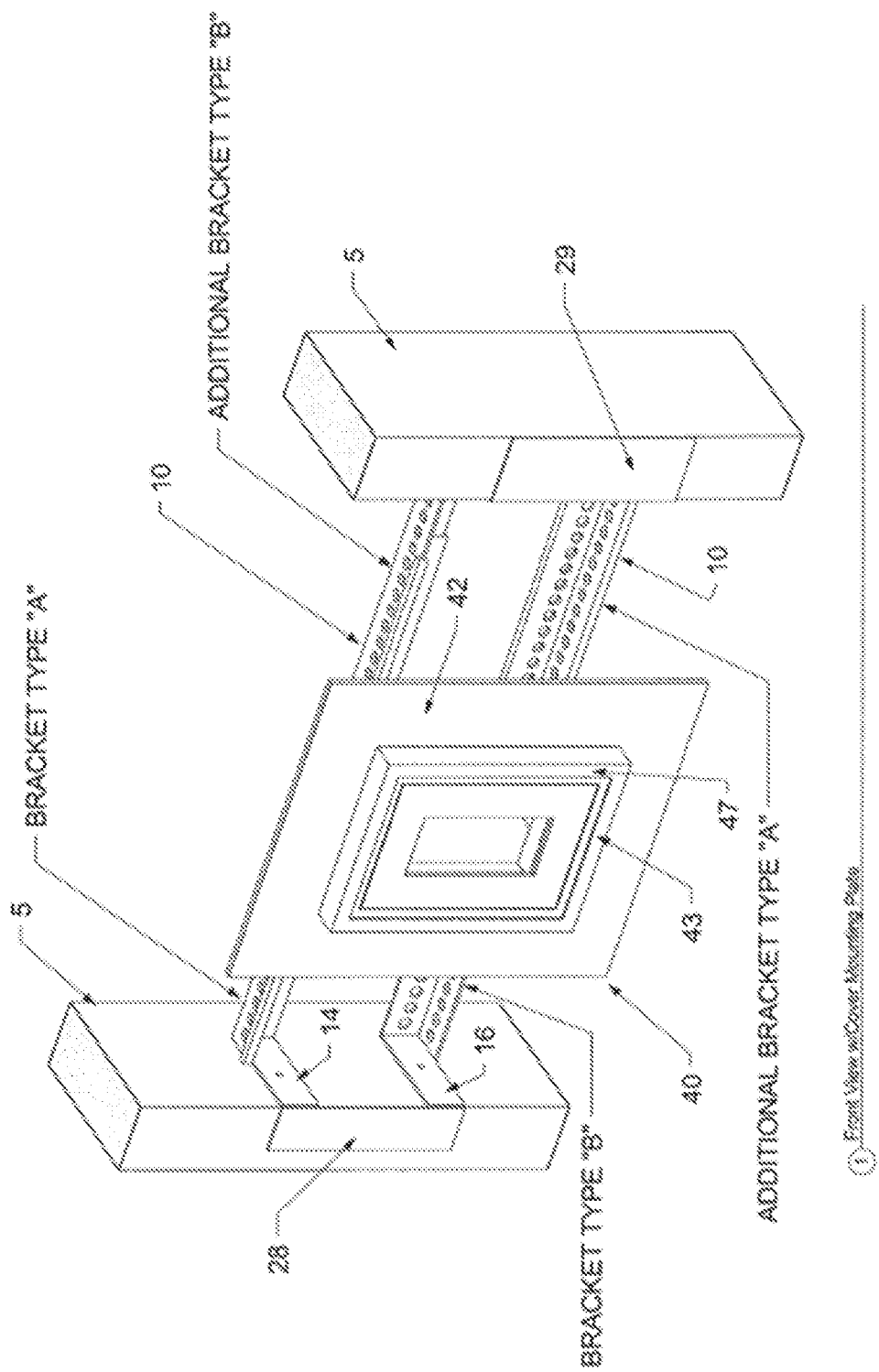
FIG. 22 is a front perspective view of the electrical device assembly mounted to the bracket assembly thereof.
Figure 23:
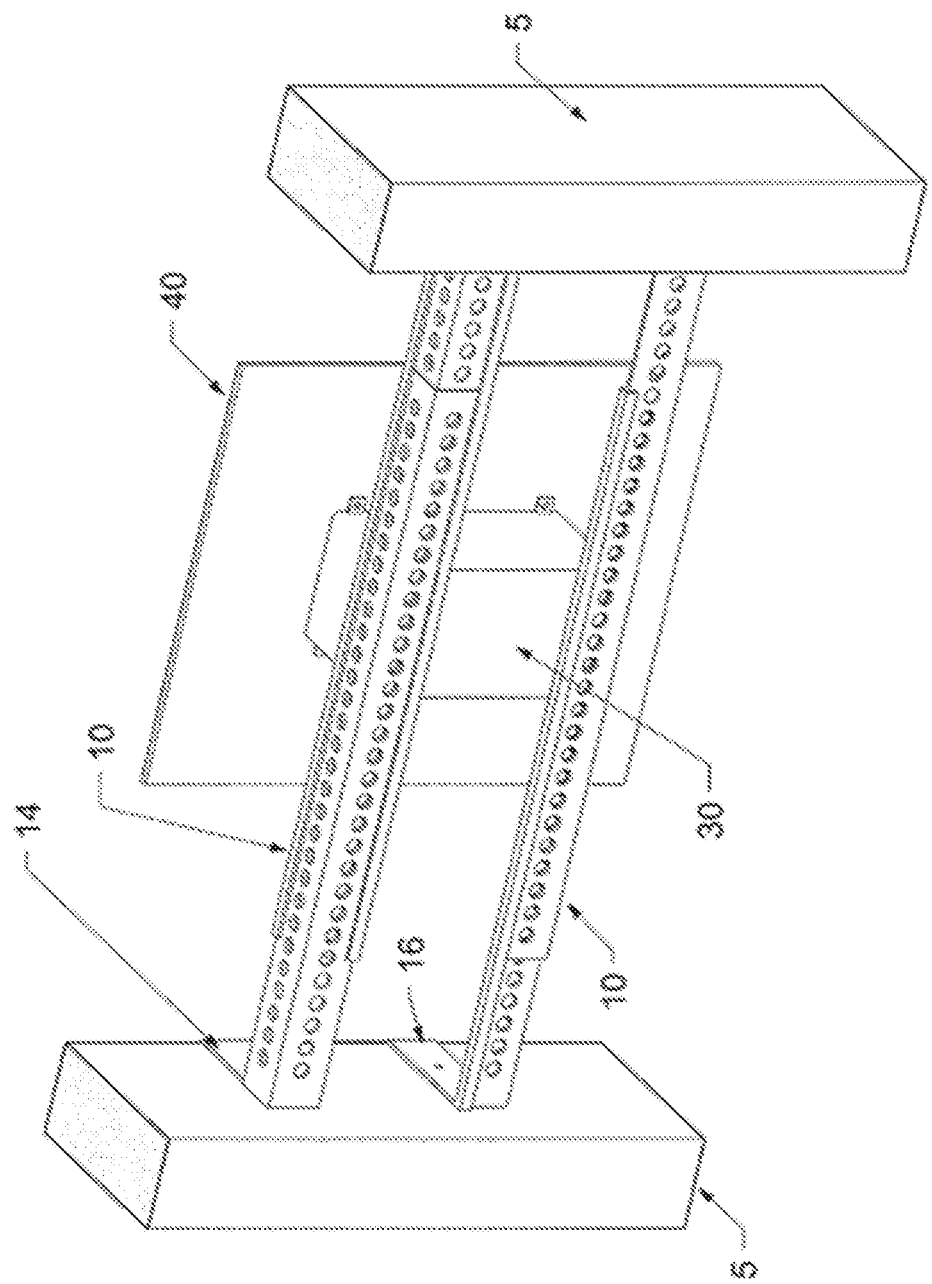
FIG. 23 is a rear perspective view of the electrical device assembly mounted to the bracket assembly thereof.

Referring to FIGS. 20, 22, and 24, the base plate 40 includes a first portion 41, and a second portion 42 disposed at an outer periphery of the first portion 41. The first portion 41 includes a plate 45 having opening 44. The plate 45 may include a plurality of holes 46. The first portion 41 includes a protruded section 43. The protruded section 43 may be disposed between the plate 45 and the second portion 42. For example, the protruded section 43 may be disposed adjacent to the second portion 42. The protruded section 43 is extended from the first portion 41 toward the finished exterior surface 81 of the wall 80, as shown in FIG. 22. The protruded section 43 includes an exterior surface 47. The distance between the exterior surface 47 and the second portion 42 is sized to accommodate the thickness of the wall board 80. Accordingly, if the wall board 80 is ½ inch thick, the distance between the exterior surface 47 and the second portion 42 is approximately ½ inch. The base plate 40 may be fastened to the second end 32 of the electrical box 30. This may be done, for example, through the holes 46. For example, screws can be used to fasten the base plate 40 to the electrical box 30, the screws passing through the holes 46 and the second holes 33. In addition, the electrical receptacle/switch 50 may be fastened to the base plate 40 through the holes 46.

The cover plate 60 may be disposed on the electrical receptacle/switch 50 and the base plate 40. For example, the electrical receptacle/switch 50 may be disposed between the cover plate 60 and the base plate 40.

The cover plate 60 includes a first side 61 and a second side 62. The cover plate 60 may include a plurality of holes 63 in which prongs of a plug may pass through. The second side 62 of the cover plate 60 may include hook portions 64, as shown in FIG. 24. The hook portions 64 of the cover plate 60 may be coupled with the hook portions 49 of the base plate 40. Accordingly, the cover plate 60 may be fastened to the base plate 40. As such the cover plate can be coupled to the base plate 40 via a mechanical snap fit connection as opposed to using magnets to provide a magnetic coupling.

The design embodied in FIGS. 20-24 is installed and assembled in a similar fashion to the design embodied in FIGS. 1-19, as discussed above.

The invention has been described with regard to certain embodiments thereof to aid in an understanding thereof, but the invention itself is more broadly defined by the recitations in any claims appended hereto, and equivalents of such recitations, and the claims are to be read with that in mind.

The invention claimed is:

1. An electrical device system for mounting to a wall structure that includes studs and wall board attached to the studs, wherein an electrical device assembly, to which an electrical component can be attached as a part of the electrical device assembly, is configured to be mountable so that an outer most component of the electrical device assembly is substantially flush with a front surface of the wall board, comprising:
   at least one bracket disposed between adjacent studs of the wall structure;
   an electrical box connected to the at least one bracket, the electrical box defining an opening;

a base plate having a flange defining an adhesive bonding surface and a ring portion defining a recess, the base plate being disposed adjacent the opening;

a cover plate received in the recess;

a backer plate received within the recess and disposed between the cover plate and the base plate; and at least one magnet supported by the cover plate, wherein the at least one magnet magnetically couples the cover plate to the backer plate wherein the brackets, base plate, and cover plate are sized and shaped such that in an assembled condition, in which the wall board is attached to the studs, outer most portions of the base plate and cover plate, respectively, are substantially flush with the front surface of the wall board and the cover plate covers at least a portion of the electrical component.

2. The electrical device system as recited in claim 1, wherein the cover plate includes at least one slot sized and shaped to receive the at least one magnet, the slots being located such that they are not visible from a front surface of the cover plate.

3. The electrical device system as recited in claim 1, wherein at least a portion of the flange includes a surface facing a rear surface of the wall board for receiving adhesive, wherein the adhesive bonds the flange to a rear surface of the wall board in the assembled condition.

4. The electrical device system as recited in claim 1, wherein the cover plate defines at least one opening that provides functional access to the electrical device.

5. The electrical device system as recited in claim 1, wherein the electrical component is an electrical receptacle.

6. The electrical device system as recited in claim 1, wherein the electrical component is switch.

7. The electrical device system as recited in claim 1, wherein the electrical component is rocker switch.

8. The electrical device system as recited in claim 1, wherein the electrical component is rocker switch having a dimmer control.

9. The electrical device system as recited in claim 1, wherein the electrical component is contactless switch.

10. The electrical device system as recited in claim 1, including at least two brackets that are slidably engaged such that the brackets are slidably mounted with respect to each other to extend between the adjacent studs.

11. The electrical device system as recited in claim 1, wherein, the at least one bracket provides a rigid mounting surface.

12. A method for mounting an electrical device system to a wall structure that includes studs and wall board attached to the studs, wherein an electrical device assembly is mounted so that the outer most component of the electrical device assembly is substantially flush with a front surface of the wall board, comprising the steps of:

attaching at least one bracket between adjacent studs of the wall structure;

attaching an electrical box to the at least one bracket;

disposing a base plate adjacent the electrical box, the base plate having a flange defining an adhesive bonding surface and a ring portion defining a recess, the ring portion having an outer edge;

disposing an electrical device at least partially within the recess of the base plate; and disposing a cover plate within the recess such that it covers at least a portion of the electrical device and is seated in alignment with the outer edge of the ring portion; and attaching a wall board to the studs, the wall board having an opening sized and shaped to receive the ring portion of the base plate;

wherein the brackets, base plate, and cover plate are sized and shaped such that when the wall board is attached to the studs, outer most portions of the base plate and cover plate, respectively, are substantially flush with the front surface of the wall board by virtue of their alignment.

13. The method of claim 12, further comprising the steps of:

applying adhesive to the flange such that the adhesive bonds the flange to a rear surface of the wall board.

14. The method of claim 12, further comprising the steps of:

disposing a masking plate in the recess, prior to disposing the cover plate in the recess;

applying wall board compound such that it extends between at least a portion of the wall board and the ring portion of the base plate.

15. The method of claim 14, further comprising the steps of:

removing the mask plate after applying the wall board compound and prior to disposing the cover plate within the recess; and applying paint such that it extends between at least a portion of the wall board and the cover plate.

16. An electrical device system for mounting to a wall structure that includes wall board attached to studs, wherein an electrical device assembly, to which an electrical component can be attached as a part of the electrical device assembly, is configured to be mountable so that an outer most component of the electrical device assembly is substantially flush with a front surface of the wall board, comprising:

at least one bracket disposed between adjacent studs of the wall structure;

an electrical box connected to the at least one bracket, the electrical box defining an opening;

a base plate having a flange defining an adhesive bonding surface and a ring portion defining a recess, the base plate being disposed adjacent the opening; and a cover plate received within the recess and retained via a snapfit;

wherein the brackets, base plate, and cover plate are sized and shaped such that in an assembled condition, in which the wall board is attached to the studs, outer most portions of the base plate and cover plate, respectively, are substantially flush with the front surface of the wall board.

17. The electrical device system as recited in, claim 16, wherein the cover plate defines at least one opening that provides functional access to the electrical device.

18. The electrical device system as recited in claim 16, including at least two brackets that are slidably engaged such that the brackets are slidably mounted with respect to each other to extend between the adjacent studs.

19. The electrical device system as recited in claim 16, wherein the at least one bracket provides a rigid mounting surface.

* * * * *